(12) United States Patent
Yusa et al.

(10) Patent No.: US 8,088,326 B2
(45) Date of Patent: Jan. 3, 2012

(54) PRODUCTION METHOD AND PRODUCTION APPARATUS FOR POLYMER MEMBER

(75) Inventors: Atsushi Yusa, Nagaoka (JP); Yoshiyuki Nomura, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 243 days.

(21) Appl. No.: 12/449,260

(22) PCT Filed: Feb. 1, 2008

(86) PCT No.: PCT/JP2008/051668
§ 371 (c)(1),
(2), (4) Date: Jul. 30, 2009

(87) PCT Pub. No.: WO2008/093842
PCT Pub. Date: Aug. 7, 2008

(65) Prior Publication Data
US 2010/0065990 A1    Mar. 18, 2010

(30) Foreign Application Priority Data
Feb. 1, 2007 (JP) ................. 2007-023021

(51) Int. Cl.
*B29C 45/18* (2006.01)
(52) U.S. Cl. .................. 264/570; 425/585
(58) Field of Classification Search ............... 264/570, 264/572; 425/585
See application file for complete search history.

(56) References Cited

U.S. PATENT DOCUMENTS
2003/0228485 A1  12/2003  Yusa et al.
2005/0175849 A1*  8/2005  Yusa et al. .............. 264/50

FOREIGN PATENT DOCUMENTS
JP  B2-3571627   9/2004
JP  B1-3696878   9/2005
JP  A-2006-131769  5/2006
JP  A-2007-5819   1/2007

OTHER PUBLICATIONS
"Surface Technology;" 2005; pp. 82-84; vol. 56; No. 2.

* cited by examiner

*Primary Examiner* — Jill Heitbrink
(74) *Attorney, Agent, or Firm* — Oliff & Berridge, PLC

(57) ABSTRACT

To provide a production method for producing a polymer member in which a pressurized fluid containing a modifying material is introduced more easily and stably into a molten resin in an injection molding machine. This task is solved by providing a production method, for producing a polymer member by using an injection molding machine provided with a mold and a heating cylinder, the method including: introducing, into a molten resin in a heating cylinder, a pressurized fluid containing a modifying material, liquid carbon dioxide, and a liquid in which the modifying material is dissolvable while controlling a flow rate of the pressurized fluid by a cylinder; and injecting the molten resin, into which the pressurized fluid is introduced, into the mold to form the polymer member in which the modifying material is contained in a surface of the polymer member.

12 Claims, 9 Drawing Sheets

PRODUCTION METHOD AND PRODUCTION APPARATUS FOR POLYMER MEMBER

TECHNICAL FIELD

The present invention relates to a production method and a production apparatus for producing a polymer member. In particular, the present invention relates to a production method and a production apparatus for producing a polymer member in which a surface internal portion is impregnated with a modifying material.

BACKGROUND ART

A technique has been hitherto suggested, wherein a surface modification method for a polymer member, which is based on the use of pressurized carbon dioxide such as carbon dioxide in the supercritical state or the like, is applied to a pretreatment for the plating. In this method, a modifying material (functional material) is dissolved in pressurized carbon dioxide, and the pressurized carbon dioxide, in which the modifying material has been dissolved, is brought in contact with a polymer member. Accordingly, the modifying material is permeated into the surface internal portion or the inside of the surface of the polymer member to highly functionalize (modify) the surface of the polymer member. For example, the present inventors have proposed a production method for producing a polymer member (molded article), wherein a surface modification treatment, which is based on the use of pressurized carbon dioxide as described above, is performed simultaneously with the injection molding to produce the polymer member (molded article) in which the surface of the polymer molded article is highly functionalized (see, for example, Japanese Patent No. 3696878).

Japanese Patent No. 3696878 discloses the following production method. At first, a resin is plasticized and weighed in a heating (plasticizing) cylinder of an injection molding machine, and then a screw, which is included in the heating cylinder, is sucked back so that the screw is moved rearwardly. Subsequently, carbon dioxide in the supercritical state (hereinafter referred to as "supercritical carbon dioxide" as well) and a modifying material (functional organic material) such as a metal complex or the like dissolved therein are introduced into a screw front portion (flow front portion) of the molten resin (melted resin) having a negative pressure (subjected to the decrease in pressure) as a result of the suck-back of the screw. In accordance with this operation, the pressurized carbon dioxide and the modifying material are permeated into the molten resin disposed at the screw front portion. Subsequently, the molten resin is injected and charged into a mold. In this process, the molten resin disposed at the screw front portion, into which the modifying material has been permeated, is firstly injected into the mold, and then the molten resin, into which the modifying material is scarcely permeated, is injected and charged. When the molten resin disposed at the screw front portion, into which the modifying material has been permeated, is injected, the molten resin disposed at the screw front portion is brought in contact with the mold while being pulled by the mold surface to form a surface layer (skin layer) in accordance with the fountain flow phenomenon (fountain effect) of the flowing resin in the mold. Therefore, when the production method described in Japanese Patent No. 3696878 is adopted, a polymer molded article is manufactured, in which the surface internal portion (inside of the surface) of the polymer molded article is impregnated with the modifying material (the surface is modified with the modifying material). For example, when a metal complex, which comprises metallic fine particles to serves as the plating catalyst, is used as the modifying material, the polymer molded article, in which the surface is impregnated with the plating catalyst, is obtained. Therefore, it is possible to obtain the injection molded article to which the electroless plating can be applied while it is unnecessary to roughen the surface with an etching solution unlike the conventional plating pretreatment method.

A method has been hitherto suggested in relation to the electroless plating method, wherein the electroless plating is performed by using an electroless plating solution containing supercritical carbon dioxide (see, for example, Japanese Patent No. 3571627 and "Surface Technology" Vol. 56, No. 2, P 83 (2005)). In the reference documents described above, the following electroless plating method is disclosed. That is, the electroless plating solution and the supercritical carbon dioxide are compatibly dissolved by using a surfactant, and an emulsion (emulsified state) is formed by the stirring or agitation to cause the plating reaction in the emulsion. In ordinary cases, in the electroplating and the electroless plating, the hydrogen gas, which is produced during the plating reaction, stays on the surface of the plating objective to cause a factor of the formation of pinholes in the plating film. However, when the electroless plating solution, which contains the supercritical carbon dioxide, is used as in the electroless plating method as disclosed in the reference documents described above, the hydrogen, which is produced during the plating reaction, is removed, because the supercritical carbon dioxide dissolves the hydrogen. Accordingly, it is stated that an electroless plating film is obtained, in which the pinholes are scarcely formed and the hardness is high.

Patent Document 1: Japanese Patent No. 3696878;
Patent Document 2: Japanese Patent No. 3571627;
Non-Patent Document 1: "Surface Technology" Vol. 56, No. 2, P 83 (2005).

DISCLOSURE OF THE INVENTION

Task to be Solved by the Invention

In the production method for producing the polymer member based on the use of the pressurized carbon dioxide such as the supercritical carbon dioxide or the like as described in Japanese Patent No. 3696878, the pressurized carbon dioxide such as the supercritical carbon dioxide or the like and the modifying material such as the metal complex or the like dissolved therein are introduced into the screw front portion (flow front portion) of the molten resin. In this procedure, it is necessary that the pressurized carbon dioxide containing the modifying material should be stably introduced in a constant amount. In view of the above, a first object of the present invention is to provide a production method for producing a polymer member in which pressurized carbon dioxide containing a modifying material is introduced into a molten resin contained in an injection molding machine more easily and more stably.

The production method for producing the polymer member described in Japanese Patent No. 3696878 uses the injection molding machine. Therefore, this method is not suitable for the continuous production of the polymer member. In view of the above, a second object of the present invention is to provide a production method and a production apparatus for producing a polymer member containing a modifying material in a surface internal portion by using an injection molding machine, the method and the apparatus for producing the polymer member being most suitable for the continuous production.

When the metallic fine particles, which serves as the plating catalyst, are permeated into the surface internal portion of the polymer member by using the production method for producing the polymer member based on the use of the pressurized carbon dioxide such as the supercritical carbon dioxide or the like as described in Japanese Patent No. 3696878, the polymer member is obtained, in which the metallic fine particles to serve as the plating catalyst exist on the surface and in the surface internal portion as described above. However, when the electroless plating is applied to the polymer member as described above, only the metallic fine particles, which exist on the outermost surface of the polymer member, contribute as the catalyst cores for the electroless plating. The metallic fine particles, which exist at the inside of the polymer member (in the surface internal portion), exist as surplus or excessive catalyst cores, which is uneconomic. When a plating film is formed on the polymer member obtained by using the technique described in Japanese Patent No. 3696878, a task or problem arises such that the physical anchoring effect of the plating film is hardly obtained, and it is difficult to obtain any strong adhesion between the plating film and the molded article, because the surface of the polymer member is not roughened. A third object of the present invention is to solve the foregoing problem and provide a method for forming an electroless plating film which is inexpensive and which has a high adhesion strength on the surface of the polymer member.

Solution for the Task

According to a first aspect of the present invention, there is provided a production method for producing a polymer member by using an injection molding machine provided with a mold and a heating cylinder; the production method comprising introducing, into a molten resin contained in a heating cylinder, a pressurized fluid containing a modifying material, liquid carbon dioxide, and a liquid capable of dissolving the modifying material while performing flow rate control for the pressurized fluid by a cylinder; and injecting the molten resin introduced with the pressurized fluid into the mold to form the polymer member containing the modifying material in a surface internal portion.

In the production method for producing the polymer member of the present invention, when the pressurized fluid, which contains the modifying material, the liquid carbon dioxide, and the liquid capable of dissolving the modifying material, is introduced into the molten resin contained in the heating cylinder of the injection molding machine, then the flow rate is controlled by the cylinder, and a constant amount of the pressurized fluid is introduced. That is, the control is performed such that the fluid, which contains the modifying material, is pressurized to prepare the pressurized fluid, and then the constant amount of the pressurized fluid is introduced in accordance with the flow rate control by the cylinder. Therefore, the pressurized fluid containing the modifying material can be introduced into the molten resin more easily and stably. A method may be conceived as a method for performing the flow rate control of the pressurized fluid, in which the flow rate of the pressurized fluid is detected by using a flow meter to perform the control while performing the pressure control. However, according to the verification performed by the present inventors, any sufficient stability is not obtained in this method. The liquid, which is capable of dissolving the modifying material, may be liquid carbon dioxide. In this case, the pressurized fluid may contain only the modifying material and the liquid carbon dioxide.

The "pressurized fluid" referred to in this specification means the fluid which is pressurized. However, it is enough that the pressure of the pressurized fluid is a pressure at which the modifying material is sufficiently dissolved. The "pressurized fluid" referred to herein includes not only the fluid pressurized to have a pressure of not less than the critical point (supercritical state) but also the fluid pressurized at a pressure lower than the critical point. Preferably, the "pressurized fluid" means the fluid pressurized to have a pressure of not less than 5 MPa. The reason, why the pressurized fluid also includes the fluid pressurized at the pressure lower than the critical point as described above, is as follows. That is, it has been revealed that the modifying material, which is contained in the pressurized fluid, is dissolved in not only the fluid in the supercritical state but also the fluid at various pressures before the arrival at the supercritical state. An example thereof is shown in FIG. 11. FIG. 11 shows the dependency on the pressure of the solubility of a metal complex (hexafluoroacetyl-acetonato palladium (II)) with respect to liquid carbon dioxide (20° C.). FIG. 11 also shows the dependency on the pressure of the solubility with respect to carbon dioxide (gas state) at 40° C. Carbon dioxide is in the supercritical state when the pressure is not less than 7.38 MPa. However, as clarified from FIG. 11, the metal complex exhibits the satisfactory solubility with respect to liquid carbon dioxide at the lower pressure of not more than the critical point (supercritical state).

In the production method for producing the polymer member of the present invention, it is preferable that the pressurized fluid is subjected to the flow rate control by two cylinders; and the production method further comprises, during molding of the polymer member, sucking the liquid carbon dioxide and the liquid into the one cylinder and the other cylinder respectively; and raising pressures of the liquid carbon dioxide contained in the one cylinder and the liquid contained in the other cylinder respectively.

The liquid carbon dioxide and the liquid are sucked into the distinct cylinders respectively during the period in which the molten resin permeated with the pressurized fluid is injected into the mold to mold the polymer member, and the liquid carbon dioxide and the liquid, which are contained in the respective cylinders, are allowed to have the pressures which are raised to the predetermined pressures respectively to wait beforehand. Accordingly, the pressurized fluid, which contains the modifying material, the liquid carbon dioxide, and the liquid, can be immediately prepared upon the next timing of the injection molding to introduce the pressurized fluid into the molten resin. Therefore, the injection operation and the molding operation of the injection molding machine can be repeated continuously in a repeated manner to perform the continuous production of the polymer member. The two fluids, which are contained in the two cylinders, are allowed to have the predetermined pressures, and then the two fluids are mixed with each other upon the next timing of the injection molding in such a situation that the two cylinders control the respective flow rates to provide the pressurized fluid which is introduced into the heating cylinder. Therefore, it is possible to perform the introduction while providing the desired amounts of the amount of the pressurized fluid and the amount of the modifying material and stabilizing the desired amounts upon the respective timings of the introduction as compared with a case in which the flow rate is controlled by detecting the flow rate of the pressurized fluid after the mixing while performing the pressurization or pressure control of the two cylinders, i.e., without changing the control operations of the respective cylinders from the pressurization control to the flow rate control.

In the production method for producing the polymer member of the present invention, it is preferable that the pressurized fluid is introduced into a flow front portion of the molten resin contained in the heating cylinder. The molten resin, which is disposed at the flow front portion, forms the superficial skin of the injection molded article in accordance with the fountain effect (fountain flow). However, the present invention is not limited thereto. For example, in a case that the polymer member is molded by using a sandwich molding machine provided with two heating cylinders, it is allowable to introduce the pressurized fluid, which contains the modifying material, into the whole molten resin contained in the heating cylinder which is to be injected firstly.

In the production method for producing the polymer member of the present invention, it is preferable that the pressurized fluid is prepared by mixing the liquid having a raised pressure in which the modifying material is dissolved and the liquid carbon dioxide having a raised pressure. In this procedure, the modifying material may be dissolved in the liquid before raising the pressure of the liquid. Alternatively, the modifying material may be dissolved in the liquid after raising the pressure of the liquid. In the method for producing the polymer member of the present invention, it is also preferable that the pressurized fluid is prepared by mixing the liquid having a raised pressure and the liquid carbon dioxide having a raised pressure in which the modifying material is dissolved.

In the production method for producing the polymer member of the present invention, it is preferable that the liquid is alcohol. Any arbitrary alcohol is usable as the alcohol provided that the modifying material is dissolvable in the alcohol. Those usable include, for example, ethanol, methanol, isopropyl alcohol, n-propanol, butanol, heptanol, and ethylene glycol. Liquid carbon dioxide may be also used as the liquid. When the liquid, in which the modifying material is dissolvable, is contained in the pressurized fluid, it is possible to improve the concentration at which the modifying material is dissolved in the pressurized fluid. When the liquid, for which the concentration is adjusted to be constant, is used, it is possible to more stably supply the pressurized fluid containing the modifying material to the molten resin.

In the production method for producing the polymer member of the present invention, it is preferable that the cylinder is a cylinder of a syringe pump. It is possible for the syringe pump to switch the pressure control and the flow rate control. When the flow rate control is performed for the pressurized fluid by using the syringe pump, then the pressurized fluid can be introduced into the molten resin more stably, and the convenient structure is available for the apparatus arrangement, for example, as compared with a case in which the flow rate of the pressurized fluid is detected by using a flow meter to perform the control while maintaining the pressure control.

For example, the following materials are usable as the modifying material in the production method for producing the polymer member of the present invention. A hydrophilic material including, for example, polyalkyl glycol or a hydrophobic material including, for example, silicone oil and fluorine-based materials may be used as the modifying material. The wettability of the surface of the polymer member can be improved by introducing, for example, a polymer or a monomer having hydroxyl group and/or amide group including, for example, polyalkyl glycol, acrylamide, and ε-caprolactam. The water repellence can be added to the surface of the polymer member by using, for example, fluorine compound and silicone oil.

Inorganic fine particles may be also used as the modifying material. When inorganic fine particles including, for example, $SiO_2$, $Al_2O_3$, $Cr_2O_3$, and $TiO_2$ are used as the modifying material, it is possible to suppress the coefficient of thermal expansion of the polymer member. Further, when inorganic fine particles including, for example, $SiO_2$ are used as the modifying material, it is possible to control the refractive index of the polymer member. When the inorganic matter as described above is used as the modifying material, it is desirable that a raw material precursor is used, or any chemical or physical modification is applied to the inorganic matter so that the inorganic matter is soluble in the liquid carbon dioxide.

A surfactant may be also used as the modifying material. In this case, the effect is expected to improve the wettability of the polymer member and avoid the electrification or electric charging. Further, those usable as the modifying material include, for example, ultraviolet stabilizers such as benzophenone and coumarin, aromatic agents, monomers of various polymers such as methyl methacrylate, polymerization initiators, and chemical agents.

In the production method for producing the polymer member of the present invention, the modifying material may be metallic fine particles to serve as catalyst cores for electroless plating. However, when the metallic fine particles are used as the modifying material, it is desirable to use, for example, a precursor of metal oxide and a metal complex containing the metallic fine particles. In the case of the use of the precursor of metal oxide and the metal complex containing the metallic fine particles as the modifying material, for example, the metallic fine particles, which serve as the catalyst cores of the electroless plating, can be permeated into the surface of the polymer base member or the polymer base material. The conductivity and/or the thermal conductivity can be added to the polymer member by permeating the metallic fine particles into the surface of the polymer base member.

When the metallic fine particles, which serve as the catalyst cores for the electroless plating, are used as the modifying material, it is preferable that the production method for producing the polymer member of the present invention further comprises swelling a vicinity of a surface of the polymer member by bringing the polymer member containing the modifying material in contact with pressurized carbon dioxide; and forming a plating film on the polymer member by bringing the polymer member in contact with an electroless plating solution containing the pressurized carbon dioxide in a state in which the vicinity of the surface of the polymer member is swelled.

The "pressurized carbon dioxide" referred to in this specification means the carbon dioxide which is pressurized. However, in this meaning, the "pressurized carbon dioxide" referred to herein includes not only the carbon dioxide in the supercritical state but also the pressurized carbon dioxide in the liquid state and the pressurized carbon dioxide gas. It is enough that the pressure of the pressurized carbon dioxide is such a pressure that the pressurized carbon dioxide is sufficiently permeated into the polymer member. The "pressurized carbon dioxide" includes not only the carbon dioxide which is pressurized to not less than the critical point (supercritical state) but also the carbon dioxide which is pressurized at a pressure lower than the critical point. The "pressurized carbon dioxide" preferably refers to the carbon dioxide which is pressurized to not less than 5 MPa.

In the method for forming the plating film of the present invention, the pressurized carbon dioxide is firstly brought in contact with the polymer member impregnated with the metallic fine particles including, for example, Pd, Ni, Pt, and Cu to serve as the plating catalyst cores at the inside of the surface (the surface internal portion). In this procedure, when the polymer member is formed of a non-crystalline or amorphous material, then the glass transition temperature is lowered, and the vicinity of the surface is softened and swelled. On the other hand, when the polymer member is formed of a crystalline material, the intermolecular distance is increased in the vicinity of the surface to cause the swelling, even if the polymer member is not softened.

Subsequently, the electroless plating solution, which contains the pressurized carbon dioxide, is brought in contact with the polymer member which is in the surface state as described above. In this procedure, the electroless plating solution is brought in contact in the state in which the vicinity of the surface of the polymer member is swelled. Therefore, the electroless plating solution can be permeated into the inside of the polymer member together with the pressurized carbon dioxide. In this procedure, the surface tension is lowered in the electroless plating solution which is mixed with the pressurized carbon dioxide in the supercritical state or the like. Therefore, the electroless plating solution is permeated more easily into the interior of the polymer member. As a result, the electroless plating solution arrives at the metallic fine particles existing at the inside of the polymer member. The plating film glows while using, as the catalyst cores, the metallic fine particles existing at the inside of the polymer member. That is, in the production method for producing the polymer member of the present invention including the method for forming the plating film as described above, the plating film glows while using, as the catalyst cores, the metallic fine particles existing not only on the surface of the polymer member but also at the inside thereof. Therefore, the plating film is formed on the polymer member in a state in which the plating film bites into the interior of the polymer member (in a state in which a part of the plating film is permeated into the interior of the polymer member). Therefore, in the method for forming the plating film of the present invention as described above, it is unnecessary to roughen the surface of the polymer member by the etching unlike the conventional electroless plating method. It is possible to easily form the plating film which is excellent in the adhesion performance, on the polymer members of various types as well. In the method for forming the plating film as described above, the surface of the polymer member is not roughened unlike the conventional electroless plating method. Therefore, it is possible to form the plating film in which the surface roughness is extremely small (in the nano-order).

In the production method for producing the polymer member of the present invention, it is preferable that the electroless plating solution contains alcohol.

According to the investigations performed by the present inventors, it has been revealed for the electroless plating method based on the use of the electroless plating solution containing supercritical carbon dioxide as disclosed, for example, in Japanese Patent No. 3571627 and "Surface Technology" Vol. 56, No. 2, P 83 (2005) that the carbon dioxide in the high pressure state and the electroless plating solution as the aqueous solution are hardly dissolved compatibly even when any surfactant is used, and it is necessary to enhance the stirring effect. Specifically, the following fact has been revealed. That is, it is necessary to use a stirring bar having a high stirring torque and/or use a high pressure container or vessel having a shallow bottom. That is, it has been revealed that the shapes of the high pressure container, the stirring bar and the like and the number of revolutions of the stirring bar are greatly restricted in order to obtain a stable emulsion by uniformly or homogeneously mixing the electroless plating solution and the pressurized carbon dioxide.

In view of the above, as a result of the repeated investigations performed by the present inventors in order to solve the problem as described above, the following fact has been revealed. That is, the carbon dioxide in the high pressure state and the plating solution are mixed with each other easily and stably by further mixing the alcohol with the electroless plating solution even when the electroless plating solution and the pressurized carbon dioxide are not agitated or stirred, while the main component of the electroless plating solution is water, for the following reason. That is, it is considered that the alcohol is compatibly dissolved with ease in the carbon dioxide in the high pressure state. Therefore, when the electroless plating solution is prepared or formulated in ordinary cases, then the undiluted solution, which contains, for example, the metal ions and the reducing agent, is diluted with water to provide a bath of the plating solution in accordance with the component ratio recommended by the manufacturer. However, in the production method for producing the polymer member of the present invention (method for forming the plating film), the stable electroless plating solution, in which the electroless plating solution and the pressurized carbon dioxide are compatibly dissolved homogeneously, can be prepared by merely additionally mixing the alcohol with water at any arbitrary ratio. The volume ratio between water and alcohol is arbitrary. However, the volume ratio is desirably within a range of 10 to 80%. If the amount of alcohol is small, any stable mixture liquid is hardly obtained. On the other hand, if the amount of the alcohol component is too large, the bath is not stabilized in some cases, for example, because nickel sulfate to be used for the nickel-phosphorus plating is insoluble in the organic solvent such as ethanol or the like.

Any arbitrary alcohol can be contained in the electroless plating solution. It is possible to use, for example, methanol, ethanol, n-propanol, isopropanol, butanol, heptanol, and ethylene glycol.

When the alcohol is added to the electroless plating solution in the method for forming the plating film as described above, the surface tension of the electroless plating solution added with the alcohol is considerably lowered, because the surface tension of alcohol is lower than that of water. Therefore, the electroless plating solution is more easily permeated into the free volume (interior) of the polymer member.

In the production method for producing the polymer member of the present invention, it is preferable that the electroless plating solution contains a surfactant. Accordingly, it is possible to further improve the compatibility (affinity) between the pressurized carbon dioxide which is, for example, the supercritical carbon dioxide and the electroless plating solution which is the aqueous solution, and it is possible to facilitate the formation of the emulsion. Further, it is also possible to improve the affinity of the plating solution for the polymer member.

As for the surfactant, it is desirable to select and use at least one or more of known nonionic, anionic, cationic, and amphoteric surfactants. In particular, it is desirable to use various surfactants confirmed to be effective to form the emulsion of supercritical carbon dioxide and water. Those usable include, for example, block copolymer of polyethylene oxide (PEO)—polypropylene oxide (PPO), ammonium carboxylate perfluoropolyether (PFPE), block copolymer of PEO—polybutylene oxide (PBO), and octaethylene glycol monododecyl ether.

In the production method for producing the polymer member of the present invention, it is preferable that the pressurized carbon dioxide is supercritical carbon dioxide having a pressure of 7.38 to 20 MPa. The critical pressure of carbon dioxide is 7.38 MPa. However, when the supercritical state higher than the above is provided, then the density is increased, and the compatibility is effected with the plating solution with ease, which is preferred. If the pressure is not less than 30 MPa, any inconvenience arises, for example, such that the amount of use of carbon dioxide is excessively increased, and/or the high pressure container is hardly sealed, which is undesirable. Taking the foregoing problem into consideration, it is practically preferable that the pressure of the pressurized carbon dioxide is not more than 20 MPa.

In the production method for producing the polymer member of the present invention, it is preferable that the modifying material further contains a substance which is dissolvable in the electroless plating solution.

In this case, the polymer base member (polymer base material) is obtained, which has the surface internal portion impregnated with the metallic fine particles such as Pd, Ni, Pt, Cu and the like to serve as the plating catalyst cores and the substance dissolvable in the electroless plating solution (hereinafter referred to as "elutable substance" as well). When the electroless plating solution, which contains the pressurized carbon dioxide, is brought in contact with the polymer base member as described above, then the elutable substance, with which the interior of the polymer base member is impregnated, is eluted into the electroless plating solution, and the electroless plating solution enters the areas having been occupied by the elutable substance (areas impregnated with the elutable substance are substituted with the electroless plating solution). As a result, the plating film also glows in the areas into which the electroless plating solution is advanced (areas having been occupied by the elutable substance). In this method, even when the material such as the crystalline material, in which the internal free volume is hardly increased, is used as the polymer base member, it is possible to easily secure the sufficient areas (spaces) in the polymer base member in which the electroless plating film glows. The size of the area occupied by the elutable substance can be controlled by the molecular weight of the elutable substance. Therefore, the fine plating particle, which grows in the area having been occupied by the elutable substance (area substituted with the electroless plating solution), has the size which can be arbitrarily controlled by the molecular weight of the elutable substance as well. Therefore, when the electroless plating film is formed on the polymer base member in which the interior of the polymer base member is impregnated with the elutable substance together with the metallic fine particles, the plating film can be formed while providing complicated shapes (for example, capillary vessel shapes, ants nest shapes, and mesh or network shapes) in the polymer base member. The plating film, which has the stronger adherence, can be formed as compared with a case in which the elutable substance is not permeated.

Any arbitrary material is available as the substance which is dissolvable in the electroless plating solution, provided that the material is dissolvable in the electroless plating solution containing the main components of water and alcohol. However, in particular, it is preferable to adopt a water-soluble substance or a soluble low molecular weight substance. Those usable as the water-soluble substance include, for example, polyalkyl glycol and mineral components such as calcium oxide, magnesium oxide and the like. Those usable as the soluble low molecular weight substance include, for example, polyalkyl glycol such as polyethylene glycol and the like and ε-caprolactam.

In the production method for producing the polymer member of the present invention, it is preferable that the method further comprises performing at least one of electroless plating and electroplating at normal pressure after forming the plating film on the polymer member.

In the production method for producing the polymer member of the present invention, it is preferable that a minimum thin metal film is formed on the surface of the polymer member in a short period of time to secure the adhesion between the metal film and the polymer member. Accordingly, it is possible to suppress any excessive permeation of the electroless plating solution into the polymer member, and it is possible to suppress the deformation and the change in quality of the polymer member which would be otherwise caused by the electroless plating solution. When it is necessary to thicken the film thickness of the plating film, then the electroless plating film is formed on the polymer member in accordance with the method of the present invention as described above, and then the conventional plating method (electroless plating method and/or electroplating method) is applied at the normal pressure. Accordingly, the metal film, which has a desired film thickness, can be stacked on the polymer member. In this method, it is possible to obtain the plating film in which both of the reliability (adhesion performance) of the metal film and the physical property such as the conductively or the like are simultaneously provided.

In the production method for producing the polymer member of the present invention, those usable as the metal to be converted into the plating coating include, for example, Ni, Co, Pd, Cu, Ag, Au, Pt, and Sn. The metal as described above is supplied from the metal salt including, for example, nickel sulfate, palladium chloride, and copper sulfate existing the electroless plating solution. Those usable as the reducing agent include, for example, dimethylamine boran, sodium hypophosphite (sodium phosphinate), hydrazine, formalin, sodium borohydride, potassium borohydride, and titanium trichloride.

Various known additives may be added to the electroless plating solution. For example, it is also allowable to add a complexing agent including, for example, citric acid, acetic acid, succinic acid, and lactic acid which forms a stable soluble complex together with the metal ion in the electroless plating solution. It is also allowable to add, as the stabilizer for the electroless plating solution, sulfur compound such as thiourea or the like, lead ion, lustering agent, and humidifying agent (surfactant).

Any arbitrary material is available for forming the polymer member capable of being used in the production method for producing the polymer member of the present invention, wherein it is possible to use thermoplastic resins, thermosetting resins, and ultraviolet-curable resins. In particular, it is desirable to use the polymer member formed of a thermoplastic resin. The type of the thermoplastic resin is arbitrary, and any one of amorphous and crystalline thermoplastic resins is applicable. Those usable include, for example, synthetic fibers such as those based on polyester, polypropylene, polyamide-based resins, polymethyl methacrylate, polycarbonate, amorphous polyolefin, polyether imide, polyethylene terephthalate, liquid crystal polymers, ABS-based resins, polyamideimide, polyphthalamide, polyphenylene sulfide, biodegradable plastics such as polylactic acid, nylon resins, and composite materials thereof. Further, it is also possible to use resin materials kneaded, for example, with various inorganic fillers including, for example, glass fibers, carbon fibers, nanocarbon, and minerals.

According to a second aspect of the present invention, there is provided a production apparatus for producing a polymer member; comprising an injection molding machine which molds the polymer member; an introducing unit which introduces a pressurized fluid containing a modifying material into a molten resin contained in the injection molding machine in accordance with flow rate control; and a control unit which is connected to the injection molding machine and the introducing unit and which controls flow of the pressurized fluid; wherein the polymer member containing the modifying material in a surface internal portion is produced.

The production apparatus for producing the polymer member of the present invention is provided with the introducing unit which prepares the pressurized fluid containing the modifying material, i.e., the pressurized fluid obtained by pressurizing the fluid containing the modifying material and which thereafter introduces the pressurized fluid into the injection molding machine in accordance with the flow rate control. Therefore, the pressurized fluid, which contains the modifying material, can be introduced into the molten resin contained in the injection molding machine more stably and more easily.

In the production apparatus for producing the polymer member of the present invention, it is preferable that the introducing unit includes a syringe pump. When the pressurized fluid is subjected to the flow rate control by using the syringe pump, then the pressurized fluid can be introduced into the molten resin more stably, and the apparatus is constructed to have the more convenient and simple structure as well, for example, as compared with a case in which the flow rate of the pressurized fluid is detected by a flow meter to perform the control while maintaining the pressure control. In the production apparatus for producing the polymer member of the present invention, it is preferable that the introducing unit further includes a dissolving tank which contains the modifying material charged therein, and the dissolving tank is in fluid communication with the syringe pump.

In the production apparatus for producing the polymer member of the present invention, it is preferable that the pressurized fluid contains the modifying material, liquid carbon dioxide, and a liquid capable of dissolving the modifying material, and the introducing unit includes a first syringe pump which raises a pressure of the liquid carbon dioxide and which allows the liquid carbon dioxide to outflow, a second syringe pump which raises a pressure of the liquid and which allows the liquid to outflow, and a mixing section which mixes the liquid carbon dioxide allowed to outflow from the first syringe pump and the liquid allowed to outflow from the second syringe pump.

In the production apparatus for producing the polymer member of the present invention, it is preferable that the introducing unit further includes a dissolving tank which contains the modifying material charged therein, and the dissolving tank is in fluid communication with one of the first and second syringe pumps.

In the production apparatus for producing the polymer member of the present invention, it is preferable that the first and second syringe pumps suck the liquid carbon dioxide and the liquid and raise the pressures thereof respectively during a period in which the polymer member is molded in the injection molding machine. Owing to the operations performed by the first and second syringe pumps as described above, the pressurized fluid, which contains the modifying material, the liquid carbon dioxide, and the liquid, can be immediately prepared and introduced into the molten resin upon the next timing of the injection molding. Therefore, it is possible to perform the continuous production of the polymer member.

In the production apparatus for producing the polymer member of the present invention, it is preferable that the injection molding machine includes an introducing section which introduces the pressurized fluid into a flow front portion of the molten resin.

In the production apparatus for producing the polymer member of the present invention, it is preferable that the production apparatus further comprises a plating solution-introducing unit which introduces an electroless plating solution into the injection molding machine.

Effect of the Invention

According to the production method and the production apparatus for producing the polymer member of the present invention, the constant amount of the pressurized fluid can be introduced while performing the flow rate control by using, for example, the syringe pump, when the pressurized fluid, which contains the modifying material, is introduced into the molten resin contained in the heating cylinder of the injection molding machine. Therefore, the pressurized fluid, which contains the modifying material, can be introduced into the molten resin more easily and more stably.

In the production method and the production apparatus for producing the polymer member of the present invention, when the liquid carbon dioxide and the liquid capable of dissolving the modifying material are sucked, for example, by the distinct syringe pumps respectively to allow them to have the predetermined raised pressures during the period in which the polymer member is injection-molded, the pressurized fluid containing the modifying material can be immediately prepared and introduced into the molten resin upon the next timing of the injection molding. Therefore, the polymer member can be produced continuously.

In the production method and the production apparatus for producing the polymer member of the present invention, when the metallic fine particles, which serve as the catalyst cores of the electroless plating, are used as the modifying material, and the method for forming the plating film is used as described above, then the plating film, which glows not only from the surface of the polymer member but also from the interior thereof, can be formed on the polymer member. Therefore, it is possible to form the plating film which is more excellent in the adhesion performance. Further, according to the method for forming the plating film as described above, the plating reaction is caused, while the electroless plating solution is permeated into the inside of the polymer member. Therefore, it is unnecessary to roughen the surface of the polymer member unlike the conventional technique. The plating film, which is excellent in the adhesion performance, can be formed on the polymer member of any type.

BRIEF DESCRIPTION OF THE DRAWINGS

FIG. 2 shows situations brought about when a pressurized mixture fluid containing a metal complex is introduced into a molten resin contained in a heating cylinder, wherein FIG. 2A shows the situation upon the completion of the plasticization and weighing of the molten resin, and FIG. 2B shows the situation upon the introduction of the pressurized mixture fluid.

PARTS LIST

8: electroless plating solution, 21: liquid carbon dioxide bomb, 20, 33, 34: syringe pump, 22, 35, 35': dissolving tank, 65: introducing valve, 500: production apparatus, 501: electroless plating apparatus section, 502, 502': surface modifying apparatus section, 503: injection molding apparatus section, 504, 604: cavity, 505: skin layer (superficial skin), 506: core layer, 507: polymer molded article, 508: control unit, 509, electroless nickel-phosphorus film, 510: gold plating film, 600: metallic fine particle, 601: water-soluble substance, 602: electroless plating film.

BEST MODE FOR CARRYING OUT THE INVENTION

An explanation will be specifically made below with reference to the drawings about embodiments of the production method and the production apparatus for producing the polymer member of the present invention. However, the following embodiments are preferred specified examples of the present invention, to which the present invention is not limited.

First Embodiment

Figure 1:
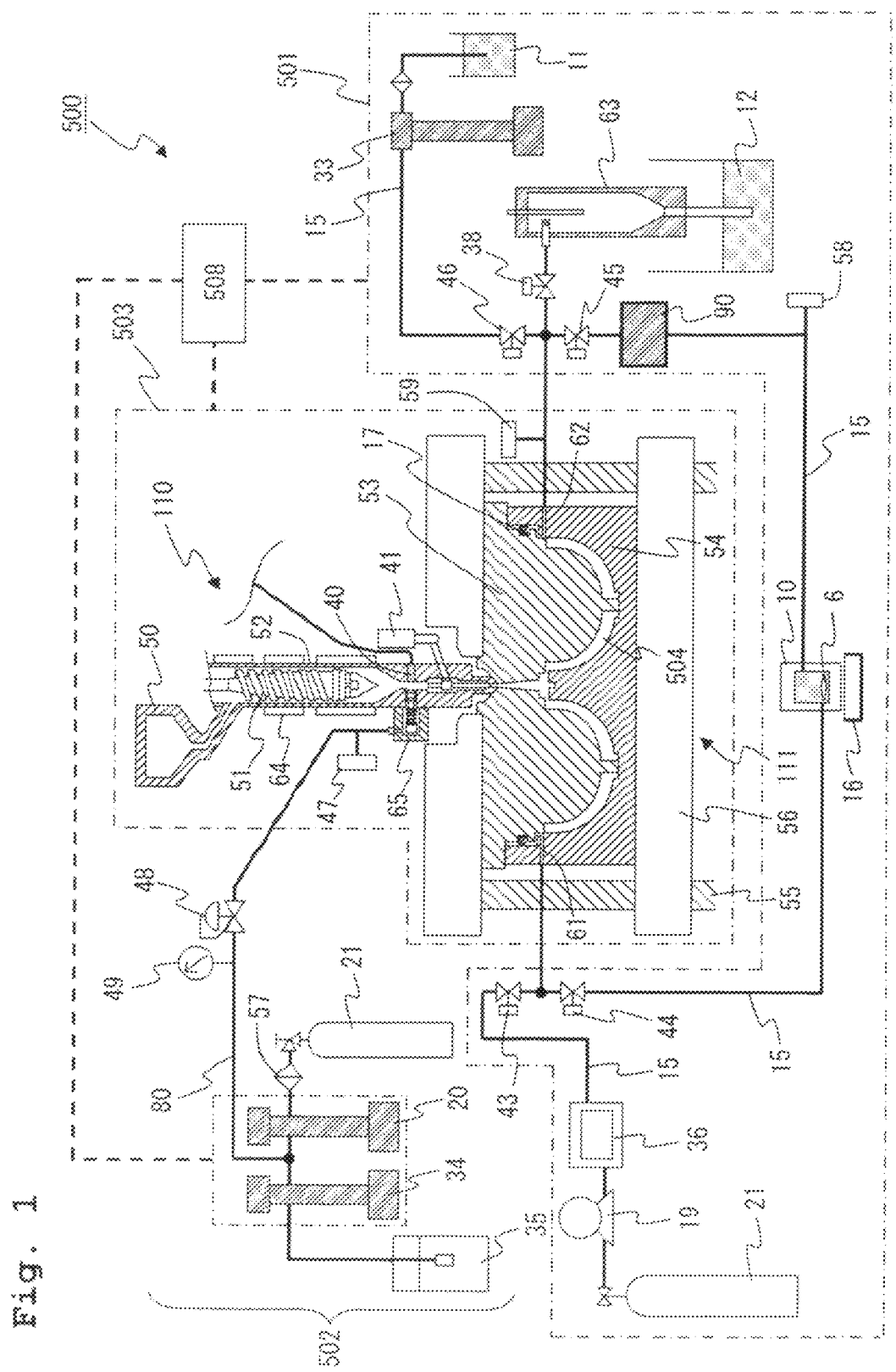
FIG. 1 shows a schematic arrangement of a production apparatus used in a first embodiment.

In the first embodiment, an explanation will be made about an exemplary case in which an automobile head light reflector was manufactured as the polymer member. In this embodiment, a polymer base member is injected and molded by using an injection molding machine, and then the electroless plating treatment is performed in the same injection molding machine to form a plating film on the polymer base member.
Production Apparatus for Polymer Member FIG. 1 shows a schematic arrangement of a production apparatus for the polymer member used in this embodiment. As shown in FIG. 1, the production apparatus 500 of this embodiment principally comprises a vertical type injection molding apparatus section 503 (injection molding machine) which includes a mold, an electroless plating apparatus section 501 which controls the supply and the discharge of the electroless plating solution containing pressurized carbon dioxide with respect to the mold, a surface modifying apparatus section 502 (introducing unit) which is provided to permeate the metal complex into the molten resin (melted resin) contained in a plasticizing cylinder of the injection molding apparatus section 503, and a control unit 508.

As shown in FIG. 1, the control unit 508 is connected to the electroless plating apparatus section 501, the surface modifying apparatus section 502, and the injection molding apparatus section 503. The control unit 508 is provided in order to control the flow (for example, the timings of the introduction and the stop) of the pressurized fluid containing the metal complex (mixture fluid of the pressurized liquid carbon dioxide and the pressurized solvent in this embodiment as described later on) between the surface modifying apparatus section 502 and the injection molding apparatus section 503 and the flow of the electroless plating solution containing the pressurized carbon dioxide between the electroless plating apparatus section 501 and the injection molding apparatus section 503.

As shown in FIG. 1, the vertical type injection molding apparatus section 503 principally includes a plasticizing melting unit 110 in which the resin for forming the polymer base member is plasticized and melted, and a clamping unit 111 which opens/closes the mold.

The plasticizing melting unit 110 principally includes the plasticizing cylinder 52 (heating cylinder) which contains a screw 51, a hopper 50, and an introducing valve 65 (introducing section) which is provided in the vicinity of the forward end (flow front portion) in the plasticizing cylinder 52 to introduce the pressurized carbon dioxide. A pressure sensor 40, which measures the internal pressure of the resin, is provided at the position of the plasticizing cylinder 52 opposed to the introducing valve 65. Polyphenylene sulfide. (FZ-8600 Black produced by Dainippon Ink and Chemicals, Incorporated) was used as the material (material for forming the polymer base member) of unillustrated resin pellets to be supplied from the inside of the hopper 50 to the inside of the plasticizing cylinder 52.

The clamping unit 111 principally includes a fixed mold 53 and a movable mold 54. In this structure, the movable mold 54 opens/closes the space or interstice between four tie bars 55 in cooperation with the driving of a movable platen 56 and an unillustrated hydraulic pressure clamping mechanism connected thereto. The movable mold 54 is formed with plating solution-introducing passages 61, 62 for supplying and discharging the pressurized carbon dioxide and the electroless plating solution with respect to a cavity 504 defined between the movable mold 54 and the fixed mold 53. As shown in FIG. 1, the plating solution-introducing passages 61, 62 are connected to a piping 15 of the electroless plating apparatus section 501 described later on. In this structure, the pressurized carbon dioxide and the electroless plating solution are introduced into the cavity 504 via the piping 15. The cavity 504 is sealed by fitting the movable mold 54 and a spring-containing seal 17 provided at the outer diameter portion of the fixed mold 53.

As shown in FIG. 1, the surface modifying apparatus section 502 principally includes a liquid carbon dioxide bomb 21, syringe pumps 20, 34, a filter 57, a back pressure valve 48, a dissolving tank 35 which contains therein the liquid (hereinafter referred to as "solvent") for dissolving the metal complex therein, and a piping 80 which connects these constitutive components. As shown in FIG. 1, the piping 80 of the surface modifying apparatus section 502 is connected to the introducing valve 65 of the plasticizing cylinder 52. A pressure sensor 47 is provided for the piping 80 in the vicinity of the introducing valve 65. In this embodiment, a metal complex (hexafluoroacetyl-acetonato palladium (II)) was used as the row material of the metallic fine particles (modifying material) charged in the dissolving tank 35, and ethanol was used as the solvent for the metal complex.

As shown in FIG. 1, the electroless plating apparatus section 501 principally includes a liquid carbon dioxide bomb 21, a pump 19, a buffer tank 36, a high pressure container 10 in which the electroless plating solution and the pressurized carbon dioxide are mixed, a circulation pump 90, a plating tank 11 which is provided to supplement the electroless plating solution, a syringe pump 33, a recovery container 63 and a recovery tank 12 which recover the electroless plating solution, and a piping 15 which connects these constitutive components. Automatic valves 43 to 46, 38, which control the flow of the pressurized carbon dioxide and the electroless plating solution, are provided at predetermined positions of the piping 15. As shown in FIG. 1, the piping 15 is connected to the plating solution-introducing passages 61, 62 of the movable mold 54.

In this embodiment, nickel-phosphorus was used for the electroless plating solution. It is also allowable to use, for the electroless plating solution, for example, nickel-boron, palladium, copper, silver, and cobalt. As for the electroless plating solution, a liquid is preferred, which makes, it possible to perform the plating in the neutral, weak alkaline, and acidic baths. Nickel-phosphorus can be used within a range of the pH value of 4 to 6 (hydrogen ion exponent), which is desirable. It is feared that any harmful influence may arise depending on the condition of the electroless plating solution before introducing the pressurized carbon dioxide, for example, such that pH of the electroless plating solution is lowered due to the permeation (introduction) of the pressurized carbon dioxide into the electroless plating solution to raise the phosphorus concentration and lower the deposition velocity of the plating film. Therefore, pH of the electroless plating solution may be previously raised.

In this embodiment, Nicoron DK produced by Okuno Chemical Industries Co., Ltd., which contained the metal salt of nickel sulfate, the reducing agent, and the complexing agent, was used as the undiluted solution for the electroless plating solution. Further, alcohol was mixed in the electroless plating solution. The type of alcohol usable in this embodiment is arbitrary. It is possible to use, for example, methanol, ethanol, n-propanol, isopropanol, butanol, heptanol, and ethylene glycol. However, ethanol was used in this embodiment. More specifically, the respective components contained in 1 l of the electroless plating solution were provided at ratios of 150 ml of the undiluted solution (Nicoron DK produced by Okuno Chemical Industries Co., Ltd.) containing the metal salt of nickel sulfate, the reducing agent, and the complexing agent, 350 ml of water, and 500 ml of alcohol (ethanol). That is, the ratio of alcohol contained in the electroless plating solution was 50%. Nickel sulfate is insoluble in alcohol. Therefore, it has been revealed that an amount of addition of alcohol exceeding 80% is inapplicable, because a large amount of nickel sulfate is precipitated.

According to the investigations performed by the present inventors, it has been revealed that the carbon dioxide in the high pressure state and the electroless plating solution are mixed with each other stably and easily by mixing the alcohol, although the main component of the electroless plating solution is water, probably for the following reason. That is, it is considered that the alcohol and the supercritical carbon dioxide are compatibly dissolved with ease. Therefore, when the electroless plating solution is mixed with the alcohol as in this embodiment, it is unnecessary to add the surfactant to the electroless plating solution, and it is unnecessary to agitate or stir the electroless plating solution. Further, it is more preferable to add the alcohol to the plating solution in order to facilitate the growth of the plating reaction at the inside of the polymer by permeating the plating solution into the polymer together with the pressurized carbon dioxide, because the surface tension is lowered as compared with a case in which only water is used. However, in the present invention, the surfactant may be added and/or the electroless plating solution may be agitated in order to further enhance the compatibility (affinity) between the pressurized carbon dioxide and the electroless plating solution. In this embodiment, octaethylene glycol monododecyl ether was added by 3 wt % as the surfactant to the electroless plating solution, and the electroless plating solution was agitated as well.

Method for Molding Polymer Base Member

Next, an explanation will be made about a method for molding the polymer base member in which the metallic fine particles are permeated into the surface internal portion. In the present invention, any arbitrary method is available to permeate the metallic fine particles into the resin. However, in this embodiment, the mixture fluid of the pressurized liquid carbon dioxide and the pressurized ethanol dissolved with the metal complex containing the metallic fine particles was introduced into the forward end portion (flow front portion) of the molten resin plasticized and weighed in the plasticizing cylinder 52.

At first, the metal complex was dissolved in ethanol (solvent) in the dissolving tank 35 of the surface modifying apparatus section 502. The ethanol, in which the metal complex was dissolved, was allowed to have a pressure raised to 15 MPa in the syringe pump 34 (second syringe pump) (the pressure-raised ethanol is hereinafter referred to as "pressurized ethanol"). On the other hand, the liquid carbon dioxide was supplied from the liquid carbon dioxide bomb 21 via the filter 53 to the syringe pump 20 (first syringe pump). The pressure of the liquid carbon dioxide was raised to 15 MPa (predetermined common pressure) in the syringe pump 20 (the pressure-raised liquid carbon dioxide is hereinafter referred to as "pressurized liquid carbon dioxide"). When the pressurized liquid carbon dioxide and the pressurized ethanol dissolved with the metal complex were supplied to the plasticizing melting unit 110, the supply was carried out while switching the control of the respective syringe pumps 20, 34 from the pressure control to the flow rate control. In this procedure, the pressurized liquid carbon dioxide and the pressurized ethanol dissolved with the metal complex were fed while being mixed with each other in the piping 80 (mixing section) (the mixed fluid is hereinafter referred to as "pressurized mixture fluid"). When the pressurized mixture fluid (pressurized fluid) was supplied to the plasticizing melting unit 110, the supply pressure of the pressurized mixture fluid was controlled by the back pressure valve 48 so that the indication of the pressure gauge 49 was 15 MPa. When the pressurized mixture fluid was supplied to the plasticizing melting unit 110, the pressurized mixture fluid was supplied to the plasticizing melting unit 110 while temperature-regulating the pressurized mixture fluid to 50° C. by an unillustrated heater in the piping 80.

Figure 2:
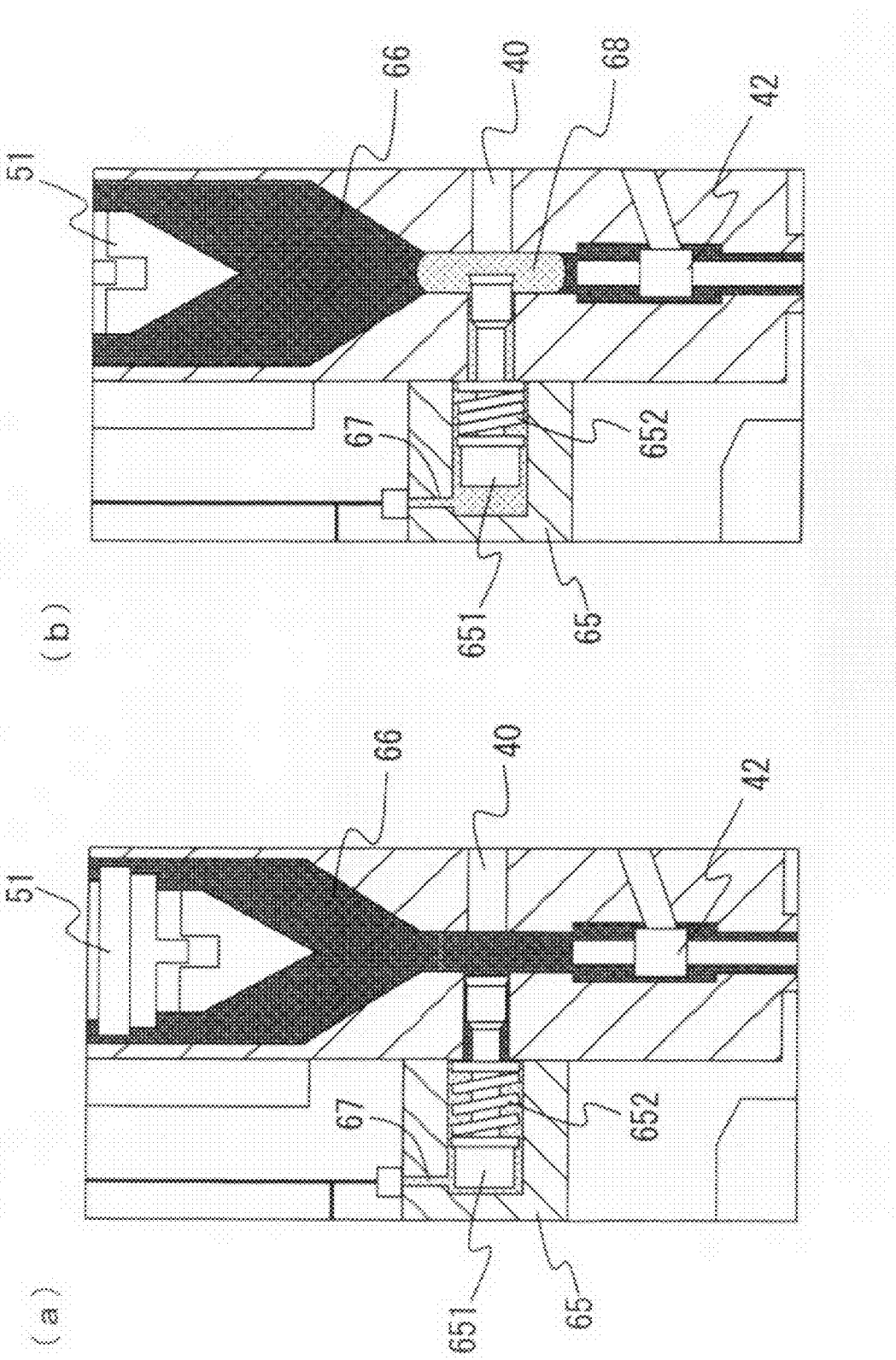
Figure 6:
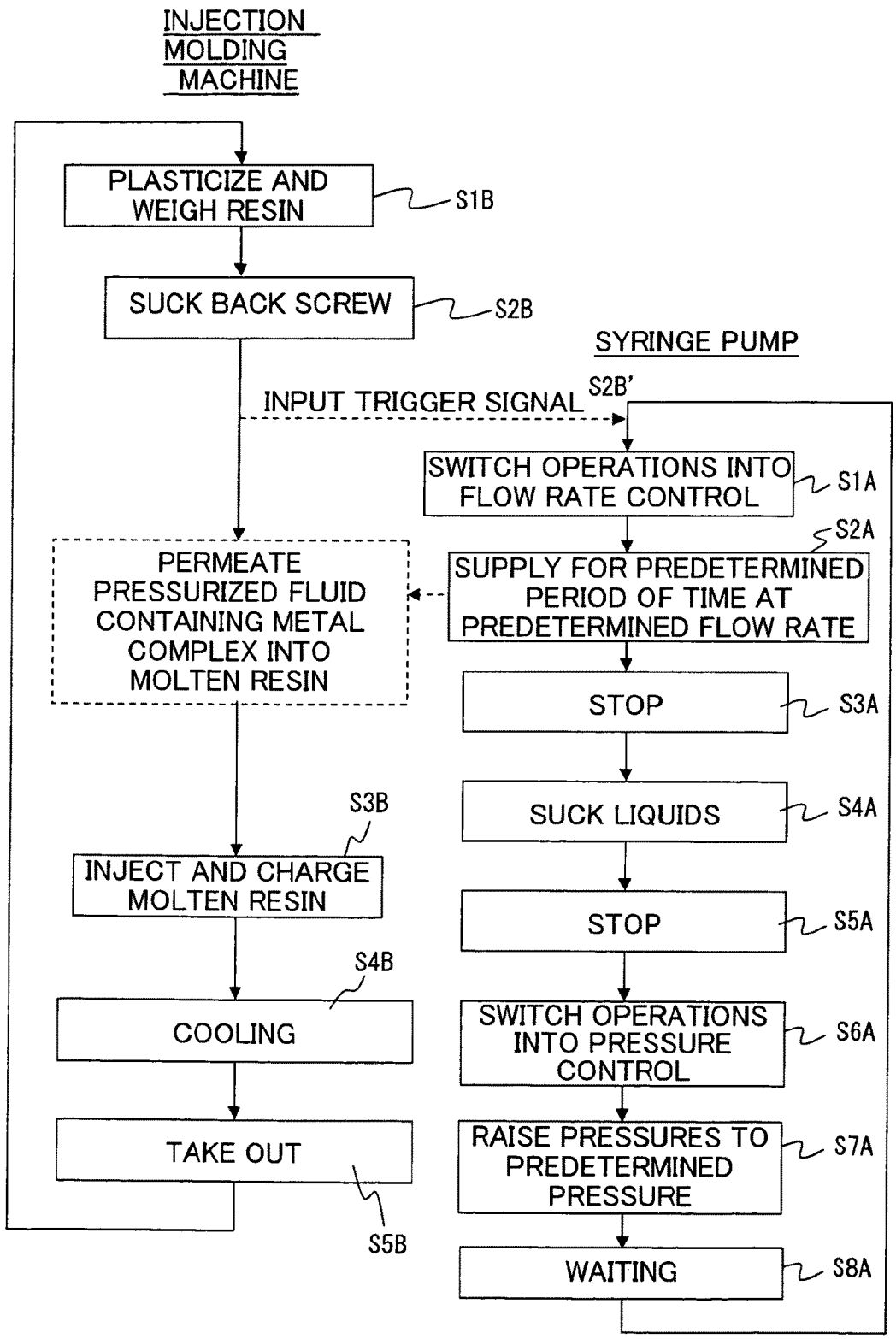
FIG. 6 shows a flow chart illustrating a procedure of the production method for producing the polymer member of the first embodiment.
Figure 7:
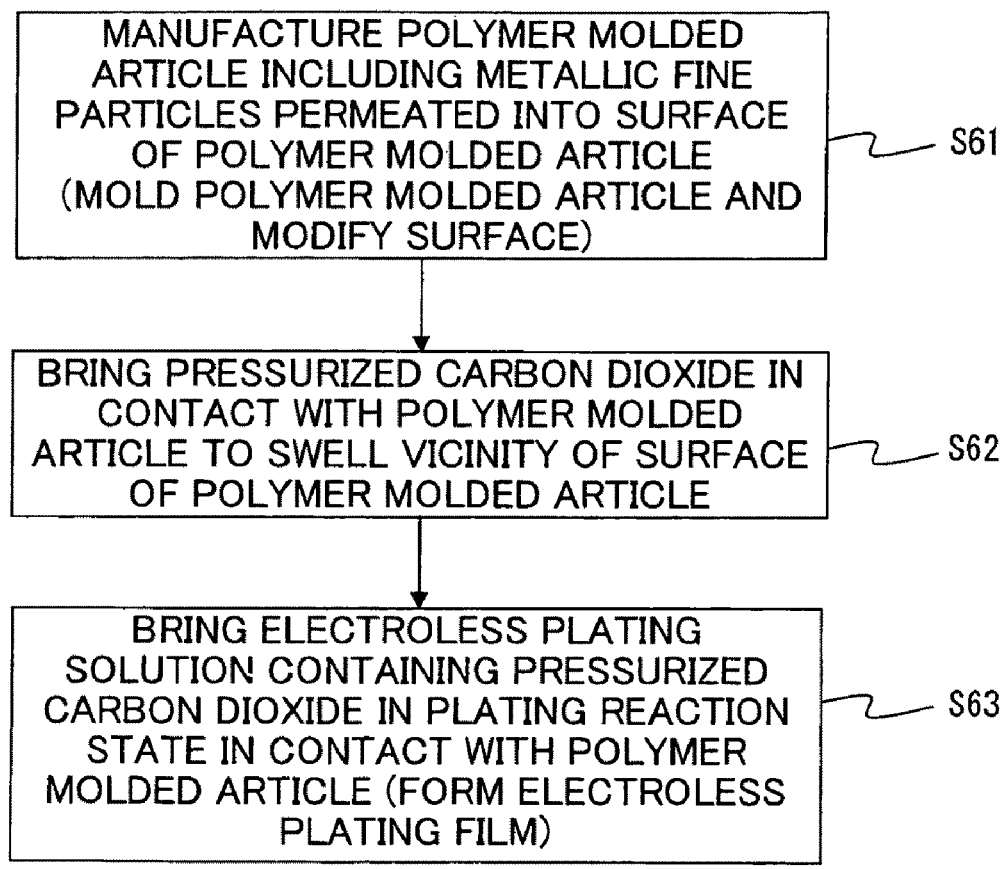
FIG. 7 shows a flow chart illustrating the procedure of the production method for producing the polymer member of the first embodiment.

An explanation will now be made in more detail with reference to FIGS. 1, 2, 6, and 7 about a serious of procedures ranging from the step of introducing the pressurized mixture fluid into the plasticizing melting unit 110 to the injection molding step of injection-molding the polymer member. FIGS. 2A and 2B show magnified sectional views illustrating those disposed in the vicinity of the introducing valve 65 of the plasticizing melting unit 110. FIG. 6 shows a flow chart illustrating the operations of the injection molding apparatus section 503 and the surface modifying apparatus section 502 when the pressurized mixture fluid is introduced into the plasticizing melting unit 110. The flow chart, which is shown on the right side in FIG. 6, is the flow chart of the operation of the surface modifying apparatus section 502. The flow chart, which is shown on the left side in FIG. 6, is the flow chart of the operation of the injection molding apparatus section 503.

At first, the screw 51 was rotated in the plasticizing cylinder 52 while supplying the resin pellets from the hopper 50 to plasticize and weigh the resin (Step S1B shown in FIG. 6). FIG. 2A shows the state of those disposed in the vicinity of the introducing valve 65 upon the completion of the plasticizing and weighing. In this situation, as shown in FIG. 2A, the introducing pin 651 of the introducing valve 65 is moved backwardly (moved to the left side as viewed in FIG. 2A). Accordingly, the pressurized mixture fluid 67 is blocked from being introduced into the molten resin 66.

Subsequently, the screw 51 was subjected to the suck back (moved backwardly) (Step S2B shown in FIG. 6) to lower the internal pressure of the molten resin 66, simultaneously with which the trigger signal was inputted to instruct the start of the introduction of the pressurized mixture fluid from the injection molding apparatus section 503 into the surface modifying apparatus section 502 (Step S2B' shown in FIG. 6), and the both of the syringe pumps 20, 34 were switched from the pressure control to the flow rate control (Step S1A shown in FIG. 6). The pressurized mixture fluid 67 was introduced via the introducing valve 65 into the molten resin 66 disposed at the flow front portion in the plasticizing cylinder 52 (state shown in FIG. 2B, Step S2A shown in FIG. 6), while the ratio between the flow rate of the pressurized ethanol dissolved with the metal complex and the flow rate of the pressurized liquid carbon dioxide was 1:10 respectively (specifically, flow rate 10 ml/min:100 ml/min). The pressurized mixture fluid 67 dissolved with the metal complex was permeated into the molten resin 66 disposed at the flow front portion (area 68 shown in FIG. 2B). In this embodiment, the pressurized mixture fluid 67 was supplied for about 5 seconds (predetermined period of time). When the pressurized mixture fluid 67 dissolved with the metal complex is permeated into the molten resin 66 disposed at the flow front portion, almost all of the metal complex undergoes the change in quality into the metallic fine particles in accordance with the thermal reduction on account of the heat of the molten resin. When the constant amount of the pressurized mixture fluid is introduced by performing the flow rate control by the syringe pumps as described above, the pressurized mixture fluid, which contains the modifying material, can be introduced into the molten resin more easily and more stably.

The introducing valve 65 of the plasticizing cylinder 52 of this embodiment has the following structure. That is, the pressurized mixture fluid 67 is introduced into the molten resin 66 contained in the plasticizing cylinder 52 when the pressure difference between the molten resin 66 and the pressurized mixture fluid 67 is not less than 5 MPa. The principle of the introduction of the pressurized mixture fluid 67 by the introducing valve 65 is as follows. When the screw 51 is subjected to the suck back after the completion of the plasticizing and weighing, then the pressure of the molten resin 66 is reduced, and the density is lowered. When the pressure difference between the molten resin 66 and the pressurized mixture fluid 67 is not less than 5 MPa, then the pressure of the pressurized mixture fluid 67 overcomes the returning force (elastic force) of the spring 652 contained in the introducing valve 65, the introducing pin 651 is moved frontwardly toward the molten resin 66, and the pressurized mixture fluid 67 is introduced into the molten resin 66. It is noted that the pressurized mixture fluid 67 was introduced, while monitoring the pressure of the resin and the pressure of the pressurized mixture fluid 67 by the pressure sensors 40, 47 respectively.

Subsequently, the both of the syringe pumps 20, 34 were stopped to stop the feeding of the pressurized mixture fluid 67 (Step S3A shown in FIG. 6). Simultaneously, the screw 51 was moved frontwardly to raise the resin pressure again, and the introducing pin 64 was moved backwardly (moved in the leftward direction as viewed in FIG. 2B). Accordingly, the introduction of the pressurized mixture fluid 67 was stopped. Further, the pressurized mixture fluid 67 and the molten resin 66 were compatibly dissolved with each other.

Figure 3:
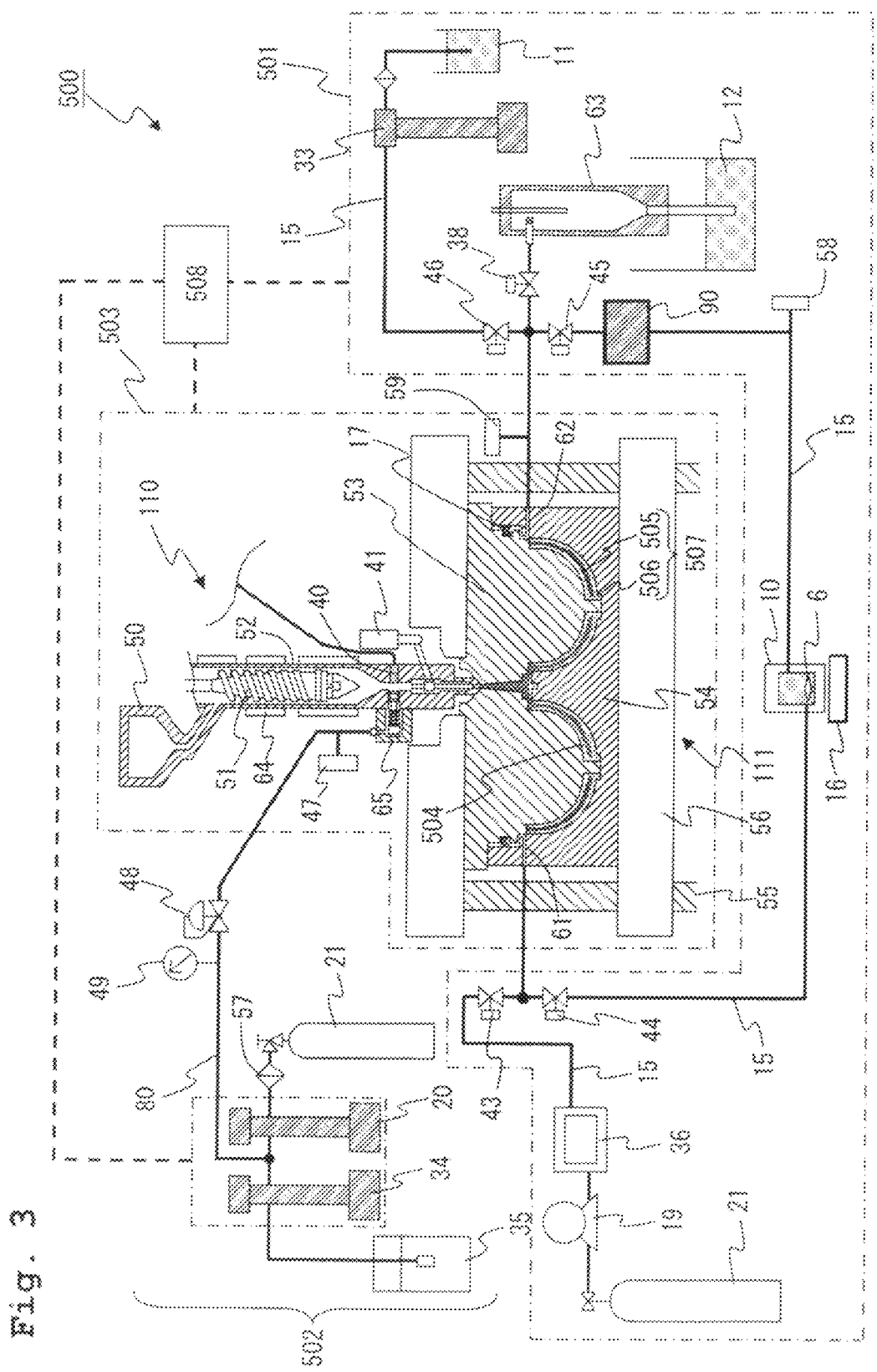
FIG. 3 shows a situation upon the completion of the injection molding of a polymer molded article in a production method for producing the polymer molded article of the first embodiment.

Subsequently, the pressurized mixture fluid 67 was introduced into the molten resin 66 disposed at the flow front portion in the plasticizing cylinder 52, and then the molten resin was injected and charged into the cavity 504 defined in the mold which was clamped by the hydraulic pressure clamping mechanism (not shown) of the clamping unit 111 and which was temperature-regulated by the temperature-regulating circuit (not shown) (Step S3B shown in FIG. 6). Subsequently, the holding pressure was applied to mold in order to suppress the foaming of the molded article, and then the molded article was cooled and solidified (Step S4B shown in FIG. 6). When the molten resin is injected into the mold to perform the molding, the molten resin 68, which is disposed at the flow front portion and which is firstly injected, forms the superficial skin of the injected molded article owing to the fountain effect (fountain flow). That is, in this embodiment, the metallic fine particles, which originate from the metal complex, are dispersed in the vicinity of the flow front portion. Therefore, as shown in FIG. 3, the polymer base member 507 is obtained, in which the superficial skin 505 (surface internal portion) of the polymer base member 507 is impregnated with the metallic fine particles. In this embodiment, the polymer base member 507 was obtained in this way (Step S61 shown in FIG. 7), in which the metallic fine particles were dispersed in the skin layer 505 as the superficial skin and the metallic fine particles were scarcely present in the core layer 506 as the inner skin. After the completion of the molding process as described above, the molded polymer member was taken out from the mold (Step S5B shown in FIG. 6). Subsequently, the molten resin is plasticized and weighed in order to perform the next shot (Step S1B shown in FIG. 6).

An explanation will now be made about the operation procedure of the surface modifying apparatus section 502 during the molding process for molding the polymer base member described above (Steps S3B and S4B shown in FIG. 6). As for the both syringe pumps 20, 34, the unillustrated automatic valve included in the piping 80 was closed (Step S3A shown in FIG. 6). After that, the first syringe pump 20 and the second syringe pump 34 were supplemented with the amounts of the flow rates of the pressurized ethanol dissolved with the metal complex and the pressurized liquid carbon dioxide supplied to the plasticizing melting unit 110 respectively. Specifically, the liquid carbon dioxide was sucked from the liquid carbon dioxide bomb 21 by the first syringe pump 20, and the ethanol dissolved with the metal complex was sucked from the dissolving tank 35 by the second syringe pump 34 (Step S4A shown in FIG. 6). Subsequently, the predetermined amounts of the liquids were sucked by the both syringe pumps 20, 34, and then the sucking operations were stopped (Step S5A shown in FIG. 6). Subsequently, the operations of the both syringe pumps 20, 34 were switched into the pressure control (Step S6A shown in FIG. 6), and the sucked liquids were pressure-raised to 15 MPa and held respectively (Step S7A shown in FIG. 6). The both syringe pumps 20, 34 were allowed to wait until the feeding for the next shot while maintaining this state (Step S8A shown in FIG. 6). As described above, in the production method for producing the polymer member of this embodiment, the pressurized liquid carbon dioxide and the pressurized ethanol dissolved with the metal complex, which are to be used for the next shot, are prepared during the molding process for molding the polymer base member. When this method is used, the pressurized mixture fluid, which is composed of the pressurized liquid carbon dioxide and the pressurized ethanol dissolved with the metal complex, can be immediately introduced into the molten resin at the predetermined pressure immediately after the input of the instruction of the next shot (trigger signal shown in FIG. 6) into the surface modifying apparatus section 502. Therefore, it is possible to perform the continuous production of the polymer member.

Method for Forming Plating Film

In this embodiment, the electroless plating treatment was performed in the mold as follows for the polymer base member 507 which was manufactured as described above and in which the surface internal portion was impregnated (dispersed) with the metallic fine particles. The interior of the mold was temperature-regulated at 80° C. during the period in which the electroless plating treatment was performed.

Figure 4:
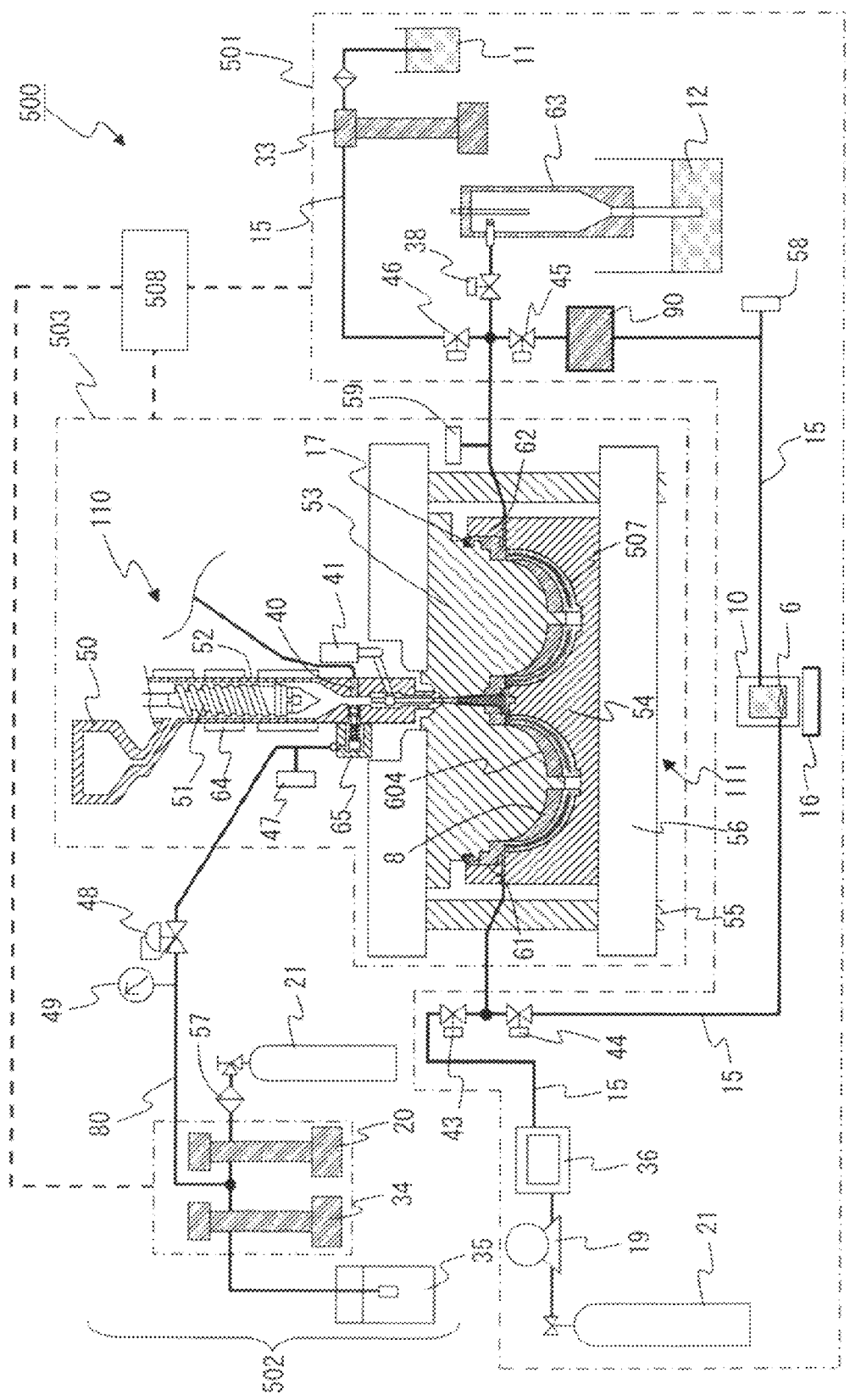
FIG. 4 shows a situation upon the application of the electroless plating treatment to the polymer molded article in the production method for producing the polymer molded article of the first embodiment.

At first, as shown in FIG. 4, the hydraulic pressure clamping mechanism (not shown) of the clamping unit 111 was moved backwardly (in the downward direction as viewed in FIG. 4). Accordingly, the movable platen 56 and the movable mold 54 were moved backwardly, and the gap 604 (cavity 604) was defined between the fixed mold 53 and the polymer base member 507.

Subsequently, the carbon dioxide, which was supplied from the carbon dioxide bomb 21 of the electroless plating apparatus section 501, was pressure-raised by the pump 19, and the carbon dioxide was stored in the buffer tank 36. Subsequently, the automatic valve 43 was opened, and the pressurized carbon dioxide, which had been stored in the buffer tank 36, was introduced into the cavity 604 via the plating solution-introducing passage 61 to bring the pressurized carbon dioxide in contact with the surface of the polymer base member 507 (Step S62 shown in FIG. 7). During this process, the cavity 604 is sealed by fitting the movable mold 54 and the sprint-containing seal 17 provided at the outer diameter portion of the fixed mold 13. Therefore, the introduced pressurized carbon dioxide does not leak to the outside of the mold. During this process, the pressure of the pressurized carbon dioxide was 15 MPa in the cavity 604. When the pressurized carbon dioxide is brought in contact with the surface of the polymer base member 507 as described above, the surface of the polymer base member 507 is swelled. Therefore, an effect is obtained such that the mixture fluid of the pressurized carbon dioxide and the electroless plating solution, which is to be introduced subsequently, is permeated into the polymer base member 507 more smoothly.

Subsequently, the electroless plating solution 8 containing the pressurized carbon dioxide was introduced into the cavity 604 as follows to bring the electroless plating solution 8 in contact with the polymer base member 507. At first, the electroless plating solution, which contained the surfactant and the alcohol supplied from the plating tank 11 of the electroless plating apparatus section 501, was mixed in the high pressure container 10 with the pressurized carbon dioxide at 15 MPa which was supplied from the buffer tank 36. In this procedure, the pressurized carbon dioxide and the electroless plating solution were compatibly dissolved in the high pressure container 10 by the driving of the stirrer 16 and the high speed rotation of the magnetic stirrer 17. Subsequently, the automatic valves 43, 46 were closed, and the automatic valves 44, 45 were opened.

Subsequently, the circulation pump 90 was operated to circulate the electroless plating solution containing the pressurized carbon dioxide in the circulation flow passage composed of the high pressure container 10, the piping 15, and the cavity 604. The electroless plating solution containing the pressurized carbon dioxide was brought in contact with the surface of the polymer base member 507 to form the plating film (nickel-phosphorus film) (Step S63 shown in FIG. 7). In this situation, the surface of the polymer molded article 507 is swelled. Therefore, the electroless plating solution is permeated from the surface of the polymer base member 507 into the interior of the polymer base member 507, and the plating film glows while using the catalyst cores of the metallic fine particles dispersed in the polymer base member 507. That is, the plating film, which is formed on the polymer base member 507, grows in such a state that a part of the plating film bites into the interior of the polymer base member 507 (in a state in which a part of the plating film is permeated into the polymer base member 507). Therefore, the plating film, which is excellent in the adhesion performance, is formed. The pressures of the cavity 604 and the circulation line 15, which were measured by the pressure sensors 58, 59, were identical with each other during the period in which the electroless plating solution containing the pressurized carbon dioxide was circulated. The electroless plating solution was supplemented at every convenience by pressure-raising the plating solution supplied from the plating tank 11 by the syringe pump 33 and feeding the plating solution simultaneously with the opening operation of the automatic valve 46.

Subsequently, after the plating film was formed on the polymer base member 507 as described above, the electroless plating solution containing the pressurized carbon dioxide was discharged from the circulation passage to the recovery tank 12 via the recovery container 63. Specifically, the automatic valves 44, 45 were closed, and then the automatic valve 38 was opened. Accordingly, the electroless plating solution containing the pressurized carbon dioxide was discharged to the recovery container 63. In the recovery container 63, the recovered electroless plating solution containing the pressurized carbon dioxide is separated into the aqueous solution (plating solution) and the high pressure gas (carbon dioxide gas) in accordance with the principle of centrifugation. The plating solution can be recovered by the recovery tank 12, and the plating solution can be reused. The gasified carbon dioxide is discharged from the upper portion of the recovery container 63, which is recovered by an unillustrated gas discharge duct.

Subsequently, the automatic valve 43 was opened for a certain period of time to introduce the pressurized carbon dioxide into the gap 604 (cavity 604) between the fixed mold 53 and the polymer base member 507. The remaining matter of the plating solution, which remained in the cavity 604, was discharged to the outside of the mold together with the pressurized carbon dioxide. Subsequently, the mold was opened at the point in time at which the internal pressure of the cavity 604 was zero as indicated by the monitored value obtained by the pressure sensor 59, and the polymer base member 507 was taken out.

Subsequently, the ordinary substitution type gold plating was applied to the taken out polymer base member 507 to stack a gold plating film on the surface of the polymer base member 507. In this embodiment, the polymer member, which had the plating film formed on the polymer base member, was obtained as described above.

Figure 5:
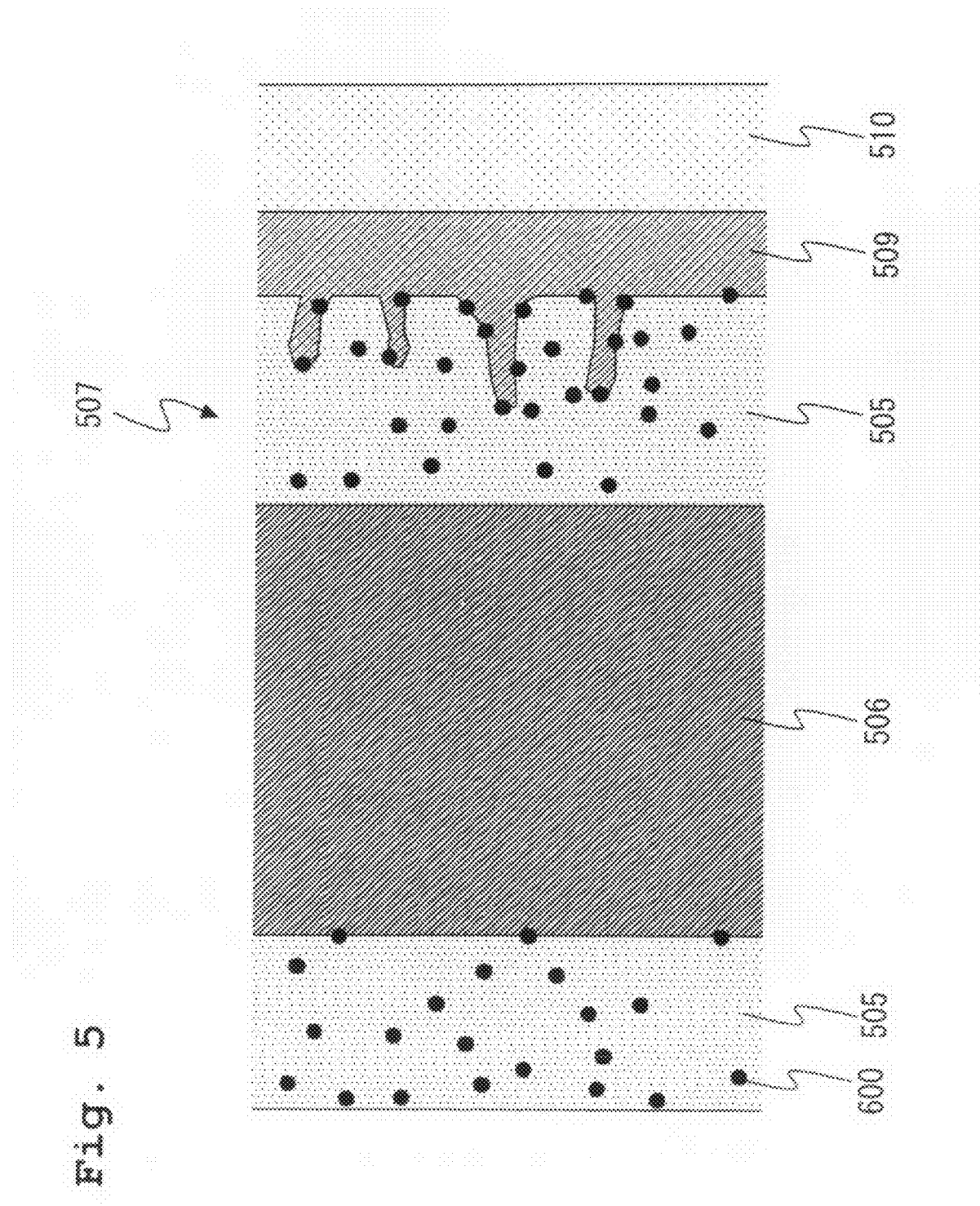
FIG. 5 schematically shows a cross-sectional structure of the polymer molded article manufactured in the first embodiment.

FIG. 5 shows a schematic sectional view of a part of the polymer member manufactured in this embodiment. It was confirmed that the metallic fine particles 600 (solid circles shown in FIG. 5) were dispersed in the skin layer 505 of the polymer member manufactured in this embodiment. The metal film 509 of nickel-phosphorus, which grew in the mold, was formed on one side of the polymer base member 507. The metal film 509 of nickel-phosphorus grew from the inside of the polymer base member 507 (permeation layer of the metal film 509 was formed). The highly reflective film 510 of gold was formed on the metal film 509 of nickel-phosphorus.

Evaluation of Plating Film

A high temperature high humidity test (condition: temperature of 80° C., humidity of 90% Rh, leaving time of 500 hours) and a heat cycle test (15 cycles between temperatures of 80° C. and 150° C.) were carried out, and then a peal test was carried out for the polymer member manufactured as described above. As a result, any film exfoliation was not caused. Further, a high temperature test was also carried out under a condition of a temperature of 150° C. and a leaving time of 500 hours. As a result, any deterioration of the adhesion performance of the metal film was not observed. Further, the surface roughness Ra of the polymer member manufactured in this embodiment was measured. As a result, the surface roughness Ra was Ra=100 nm which was equivalent to the surface roughness of the mold. That is, according to the production method for producing the polymer member of this embodiment, the following fact has been revealed. The plating treatment can be performed simultaneously with the injection molding, and the process can be simplified. Additionally, the smooth metal film, which has the high adhesion performance, can be formed on the resin material having the high heat resistance.

The first embodiment is illustrative of the exemplary case in which the metal complex is introduced into the flow front portion of the molten resin to perform the injection molding, and the metallic fine particles are permeated into the surface internal portion of the polymer base member during the injection molding of the polymer base member. However, the present invention is not limited thereto. A polymer base member, in which the surface internal portion is impregnated with the metallic fine particles, may be molded by the sandwich molding method. Specifically, a sandwich molding machine, which is provided with two heating cylinders, may be used. At first, the molten resin, into which the metal complex is permeated, may be injected from one heating cylinder, and then the molten resin, which does not contain the metallic fine particles, may be injected from the other heating cylinder to perform the molding.

Second Embodiment

In the second embodiment, an explanation will be made about a method wherein the polymer base member is injection-molded by using the injection molding machine which is the same as or equivalent to that used in the first embodiment, and then the electroless plating treatment is performed in the same injection molding machine. In this embodiment, an automobile head light reflector was manufactured as the polymer member in the same manner as in the first embodiment. Polyphenylene sulfide (FZ-8600 Black produced by Dainippon Ink and Chemicals, Incorporated) was also used as the material for forming the polymer base member. Further, the metal complex (hexafluoroacetyl-acetonato palladium (II)) was used as the raw material for the metallic fine particles.

In this embodiment, polyethylene glycol having an average molecular weight of 1,000 as a water-soluble substance (substance soluble in the electroless plating solution: elutable substance) was introduced into the forward end portion (flow front portion) of the plasticized and weighed molten resin contained in the plasticizing cylinder (heating cylinder) to impregnate the surface of the polymer base member therewith together with the metallic fine particles. Specifically, the metal complex and polyethylene glycol were dissolved in ethanol in the dissolving tank 35, and the pressurized mixture fluid, which contained the pressurized carbon dioxide and the pressurized ethanol dissolved with the metal complex and polyethylene glycol, was introduced into the forward end portion (flow front portion) of the molten resin. Other than the above, the polymer member of this embodiment was manufactured in the same manner as in the first embodiment.

Figure 8:
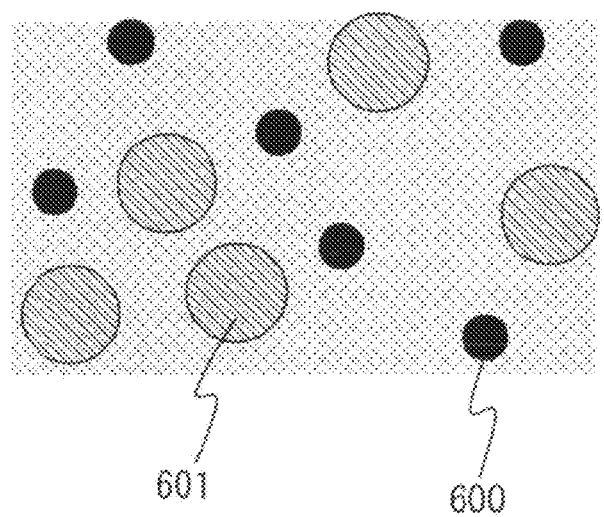
FIG. 8 schematically shows a cross-sectional structure of an internal portion disposed in the vicinity of a surface of a polymer member manufactured in a second embodiment.

In this embodiment, the metal complex and polyethylene glycol were introduced into the flow front portion of the molten resin contained in the plasticizing cylinder 52 to injection-mold the polymer base member. Therefore, the polymer member is obtained, in which the skin layer (surface internal portion) of the polymer base member is impregnated with the metallic fine particles and polyethylene glycol, and the metallic fine particles and polyethylene glycol are scarcely permeated into the core layer. FIG. 8 shows this situation. FIG. 8 shows a schematic sectional view illustrating those disposed in the vicinity of the surface (part of the skin layer) of the polymer base member molded in this embodiment. As shown in FIG. 8, the metallic fine particles 600 and polyethylene glycol 601 are dispersed in the vicinity of the surface of the polymer base member immediately after of the molding of this embodiment. Polyethylene glycol 601, with which the interior of the polymer base member molded in this embodiment was impregnated, had a particle size which was investigated by EPMA (Electron Probe Micro Analyzer). As a result, the particle size was about 50 nm.

Subsequently, the polymer base member, which had the skin layer impregnated with the metallic fine particles 600 and polyethylene glycol 601 as shown in FIG. 8, was brought in contact with the electroless plating solution containing the pressurized carbon dioxide in the same manner as in the first embodiment to form a plating film on the polymer base member.

When the electroless plating solution containing the pressurized carbon dioxide is brought in contact with the surface of the polymer base member in the state in which the surface is swelled, then the electroless plating solution is permeated into the polymer base member, and the electroless plating solution arrives at polyethylene glycol 601. In this situation, polyethylene glycol 601 is the water-soluble substance, and hence polyethylene glycol 601 is eluted into water and alcohol which are the main components of the electroless plating solution. The electroless plating solution enters the areas having been occupied by polyethylene glycol 601 (in which polyethylene glycol has been located) (the areas occupied by the polyethylene glycol 601 are substituted with the electroless plating solution). As a result, the electroless plating film also grows in the areas having been occupied by polyethylene glycol 601 (areas substituted with the electroless plating solution). In this way, in this embodiment, the plating film can grow in the areas in which polyethylene glycol 601 has been located. Therefore, even when the crystalline material, in which the free volume is hardly increased or enlarged at the inside of the polymer, is used as the material for forming the polymer base member, the areas, in which the electroless plating film glows, can be easily secured at the inside of the polymer base member.

Figure 9:
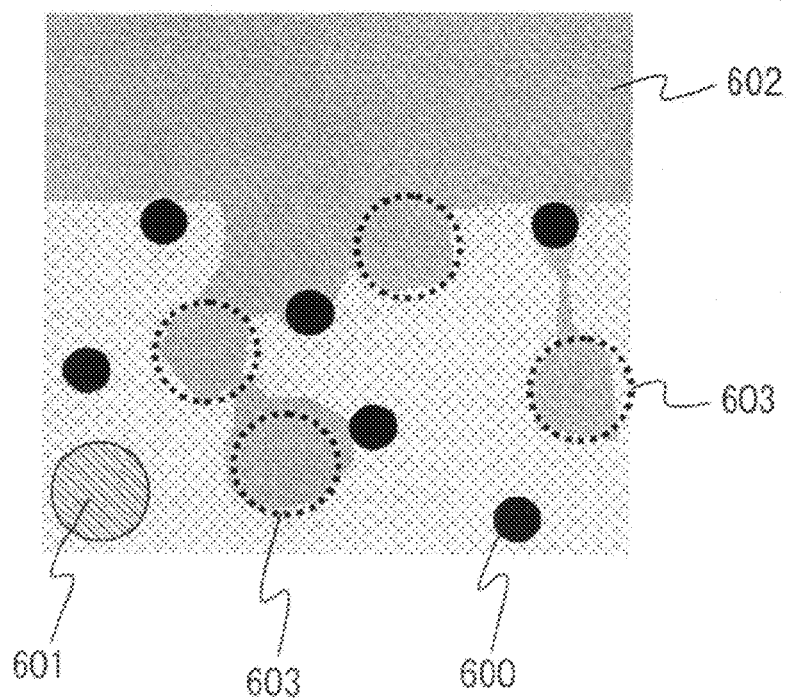
FIG. 9 schematically shows a cross-sectional structure in the vicinity of an interface between a plating film and a polymer base member of the polymer member manufactured in the second embodiment.

FIG. 9 shows a situation of the interface between the polymer base member and the plating film when the plating film is formed on the polymer base member in accordance with the production method of this embodiment. In this embodiment, the plating film glows not only in the surroundings of the metallic fine particles 600 with which the polymer base member is impregnated but also in the areas in which polyethylene glycol 601 has been located (areas surrounded by broken lines 603 in FIG. 9). Therefore, as shown in FIG. 9, the plating film 602 glows while providing extremely complicated shapes in the polymer base member. The plating film, which is continued from the interior of the polymer base member, can be formed on the polymer base member. Therefore, the plating film, which has the higher adhesion performance, is formed. As shown in FIG. 9, polyethylene glycol 601 is not eluted from the areas of polyethylene glycol 601 at which the electroless plating solution does not arrive, and the areas remain in the polymer base member in a state in which the areas exist exactly as they are.

The adhesion performance of the metal film was also evaluated for the polymer member manufactured in this embodiment by the high temperature high humidity test which was the same as or equivalent to that carried out in the first embodiment. The high temperature test was also carried out under a condition of a temperature of 150° C. and a leaving time of 500 hours. As a result, the same or equivalent result as that obtained in the first embodiment was obtained. Any decrease in the adhesion performance of the metal film was not observed. Further, the surface roughness Ra of the polymer member manufactured in this embodiment was measured. As a result, the surface roughness Ra was Ra=100 nm which was equivalent to the surface roughness of the mold. That is, according to the method for forming the plating film of this embodiment, the following fact has been revealed. The plating treatment can be performed simultaneously with the injection molding, and the process can be simplified. Additionally, the smooth metal film, which has the high adhesion performance, can be formed on the resin material having the high heat resistance.

This embodiment is illustrative of the exemplary case in which polyethylene glycol is used as the water-soluble substance in order to form the sufficient areas for the plating film to grow in the polymer base member. However, the present invention is not limited thereto. It is also allowable to use, for example, mineral components such as magnesium oxide, calcium carbonate and the like, starch, sodium alginate, polyvinyl alcohol, polyvinyl methyl ether, and acrylic acid. In place of the water-soluble substance, it is also allowable to use soluble low molecular weight materials including, for example, polyethylene oxide, ε-caprolactam, alcohol (for example, ethanol, propanol, and butanol), ethylene glycol, polyacrylic acid, polyvinylpyrrolidone, ethyl cellulose, and acetyl cellulose.

Third Embodiment

In the third embodiment, an explanation will be made about a method wherein the polymer base member, which has the surface impregnated with the metallic fine particles and polyethylene glycol (elutable substance), is injection-molded in the same manner as in the second embodiment, and then the electroless plating treatment is performed in the same injection molding machine. In the case of the production apparatus for producing the polymer member used in this embodiment, the structure of the surface modifying apparatus section (introducing unit) was changed as compared with the first embodiment. Other than the above, the structure is the same as the structure of the production apparatus of the first embodiment.

Figure 10:
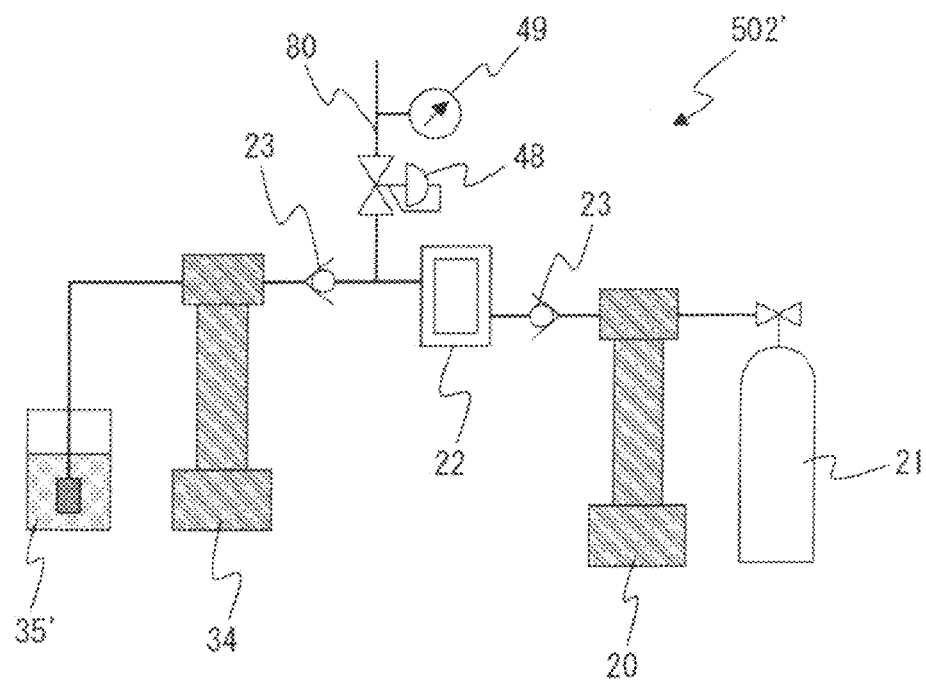
FIG. 10 shows a schematic arrangement of a surface modifying apparatus section used in a third embodiment.
Figure 11:
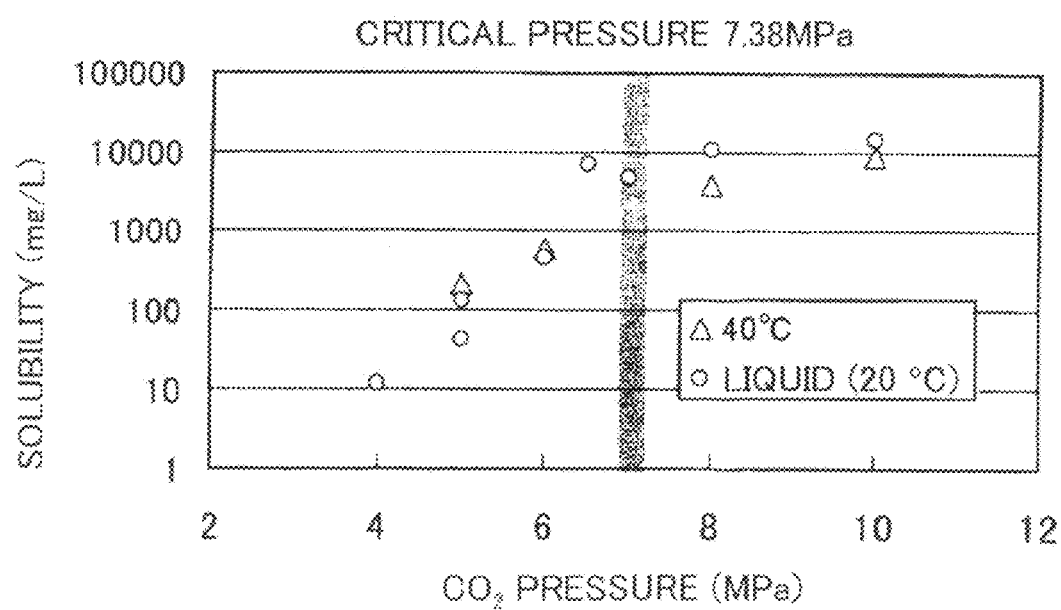
FIG. 11 shows the pressure-dependency of the solubility of the metal complex with respect to carbon dioxide.

FIG. 10 shows a schematic arrangement of the surface modifying apparatus section of this embodiment. As clarified from FIGS. 1 and 10, the principal structural difference between the surface modifying apparatus section 502' of this embodiment and the surface modifying apparatus section 502 of the first embodiment resides in the fact that a second dissolving tank 22 is provided between the back pressure valve 48 and the first syringe pump 20 for sucking and pressure-raising the liquid carbon dioxide in this embodiment.

In the second embodiment, the metallic fine particles and polyethylene glycol were dissolved in ethanol in one dissolving tank 35. However, in this embodiment, polyethylene glycol was dissolved in ethanol in the first dissolving tank 35', and the metal complex containing the metallic fine particles was charged into the second dissolving tank 22. Therefore, in this embodiment, the pressurized mixture fluid, which is to be introduced into the molten resin contained in the injection molding apparatus section, is prepared as follows. At first, the pressurized liquid carbon dioxide having a predetermined pressure is prepared by using the first syringe pump 20, and the ethanol, in which polyethylene glycol is dissolved, is pressure-raised to have a predetermined pressure by using the second syringe pump. The operations of the first and second syringe pumps are switched from the pressure control to the flow rate control in accordance with the instruction to introduce the pressurized mixture fluid (trigger signal shown in FIG. 6), and the pressurized liquids, which are allowed to outflow from the both syringe pumps, are mixed with each other. In this procedure, the pressurized liquid carbon dioxide passes through the second dissolving tank 22 in which the metal complex is charged, and the metal complex is dissolved in the pressurized liquid carbon dioxide. In the piping 80, the pressurized ethanol dissolved with polyethylene glycol and the pressurized liquid carbon dioxide dissolved with the metal complex are mixed with each other to prepare the pressurized mixture fluid. The polymer base member was molded in the same manner as in the second embodiment except for the method for preparing the pressurized mixture fluid. In this embodiment, the electroless plating film was formed on the polymer base member in the same manner as in the second embodiment.

The adhesion performance of the metal film was also evaluated for the polymer member manufactured in this embodiment by the high temperature high humidity test which was the same as or equivalent to that carried out in the first embodiment. The high temperature test was also carried out under a condition of a temperature of 150° C. and a leaving time of 500 hours. As a result, the same or equivalent result as that obtained in the first embodiment was obtained. Any decrease in the adhesion performance of the metal film was not observed. Further, the surface roughness Ra of the polymer member manufactured in this embodiment was measured. As a result, the surface roughness Ra was Ra=100 nm which was equivalent to the surface roughness of the mold. That is, according to the method for forming the plating film of this embodiment, the following fact has been revealed. The plating treatment can be performed simultaneously with the injection molding, and the process can be simplified. Additionally, the smooth metal film, which has the high adhesion performance, can be formed on the resin material having the high heat resistance.

The first to third embodiments described above are illustrative of the exemplary cases in which the crystalline material is used as the material for forming the polymer member (polymer molded article). However, the present invention is not limited thereto. The same or equivalent effect is also obtained even when a non-crystalline or amorphous material is used as the material for forming the polymer member (polymer molded article).

INDUSTRIAL APPLICABILITY

In the production method and the production apparatus for producing the polymer member of the present invention, the pressurized fluid containing the modifying material can be introduced into the molten resin contained in the injection molding machine more easily and stably. Further, the production method and the production apparatus are most suitable for the continuous production. Therefore, the production method and the production apparatus are preferred as the production method and the production apparatus for producing the polymer member having the surface impregnated with the modifying material by using the injection molding machine.

When the electroless plating treatment is carried out in the injection molding machine according to the production method and the production apparatus for producing the polymer member of the present invention, the smooth metal film, which has the high adhesion performance, can be formed on the resin material which has the high heat resistance. Therefore, the production method and the production apparatus are preferred as the manufacturing method and the manufacturing apparatus for manufacturing, for example, the automobile head light reflector including, for example, LED for which the high heat resistance is required.

The invention claimed is:

1. A production method for producing a polymer member by using an injection molding machine provided with a mold and a heating cylinder, the production method comprising:
    introducing, into a molten resin in a heating cylinder, a pressurized fluid containing a modifying material, liquid carbon dioxide, and a liquid in which the modifying material is dissolvable;
    controlling a flow rate of the pressurized fluid by a syringe pump during the introducing step, the syringe pump including a first syringe pump for the liquid carbon dioxide and a second syringe pump for the liquid;
    injecting the molten resin, into which the pressurized fluid has been introduced, into the mold to form the polymer member in which the modifying material is contained inside of the surface of the polymer member; and
    during forming of the polymer member, preparing for a subsequent introducing step by:
        sucking an additional quantity of liquid carbon dioxide into the first syringe pump and sucking an additional quantity of liquid into the second syringe pump;
        raising a pressure of the additional quantity of liquid carbon dioxide in the first syringe pump and a pressure of the additional quantity of liquid in the second syringe pump; and
        maintaining the pressure of the additional quantity of liquid carbon dioxide in the first syringe pump and the pressure of the additional quantity of liquid in the second syringe pump until the subsequent introducing step.

2. The production method according to claim 1, wherein the pressurized fluid is introduced into a flow front portion of the molten resin in the heating cylinder.

3. The production method according to claim 1, wherein the pressurized fluid is prepared by mixing the liquid of which pressure is raised and in which the modifying material is dissolved and the liquid carbon dioxide of which pressure is raised.

4. The production method according to claim 1, wherein the pressurized fluid is prepared by mixing the liquid of which pressure is raised and the liquid carbon dioxide of which pressure is raised and in which the modifying material is dissolved.

5. The production method according to claim 1, wherein the liquid is alcohol.

6. The production method according to claim 1, wherein the liquid is liquid carbon dioxide.

7. The production method according to claim 1, wherein the modifying material is metallic fine particles serving as catalyst cores for electroless plating.

8. A production apparatus which produces a polymer member, comprising:
    an injection molding machine which molds the polymer member;
    an introducing device including a syringe pump which introduces a pressurized fluid into a molten resin in the injection molding machine in accordance with flow rate control by the syringe pump, the pressurized fluid including a modifying material, a liquid carbon dioxide, and a liquid in which the modifying material is dissolvable, and the syringe pump including a first syringe pump for the liquid carbon dioxide and a second syringe pump for the liquid; and
    a control device which is connected to the injection molding machine and the introducing device and which controls flow of the pressurized fluid, and the control device is adapted, during a period in which the polymer member is being molded, to control the first syringe to suck an additional quantity of liquid carbon dioxide, to control the second syringe to suck an additional quantity of liquid, to raise the pressure of the additional quantity of liquid carbon dioxide, to raise the pressure of the additional quantity of liquid, and to maintain the pressures of the additional quantity of liquid carbon dioxide and the additional quantity of liquid at least until a subsequent introducing operation of the introducing device;
    wherein the production apparatus produces the polymer member in which the modifying material is contained inside of the surface of the polymer member.

9. The production apparatus according to claim 8, wherein the introducing device further includes a dissolving tank which contains the modifying material charged therein, and the dissolving tank is in fluid communication with the syringe pump.

10. The production apparatus according to claim 8, wherein the introducing device further comprises a mixing section which mixes the liquid carbon dioxide from the first syringe pump and the liquid from the second syringe pump.

11. The production apparatus according to claim 10, wherein the introducing device further includes a dissolving tank which contains the modifying material charged therein, and the dissolving tank is in fluid communication with one of the first and second syringe pumps.

12. The production apparatus according to claim 8, wherein the injection molding machine includes an introducing section which introduces the pressurized fluid into a flow front portion of the molten resin.

* * * * *